United States Patent
Tomiyasu

(10) Patent No.: US 9,288,701 B2
(45) Date of Patent: Mar. 15, 2016

(54) MOBILE RADIO APPARATUS AND MOBILE COMMUNICATION SYSTEM

(71) Applicant: FUJITSU LIMITED, Kawasaki-shi, Kanagawa (JP)

(72) Inventor: Kosuke Tomiyasu, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/570,227

(22) Filed: Dec. 15, 2014

(65) Prior Publication Data
US 2015/0223123 A1 Aug. 6, 2015

(30) Foreign Application Priority Data

Feb. 4, 2014 (JP) ................................. 2014-019089

(51) Int. Cl.
*H04W 36/26* (2009.01)
*H04W 24/08* (2009.01)
*H04W 36/00* (2009.01)
*H04W 84/04* (2009.01)

(52) U.S. Cl.
CPC .......... *H04W 24/08* (2013.01); *H04W 36/0061* (2013.01); *H04W 36/26* (2013.01); *H04W 84/045* (2013.01)

(58) Field of Classification Search
CPC ... H04W 36/04; H04W 16/32; H04W 84/045; H04W 36/30; H04W 92/02; H04W 24/08; H04W 36/0061; H04W 36/26
See application file for complete search history.

(56) References Cited

U.S. PATENT DOCUMENTS

| 5,898,926 | A | 4/1999 | Konishi | |
|---|---|---|---|---|
| 9,036,578 | B2 * | 5/2015 | Cai | H04L 1/18 370/329 |
| 2013/0201884 | A1 * | 8/2013 | Freda | H04W 72/005 370/278 |
| 2014/0334371 | A1 * | 11/2014 | Kim | H04W 52/0206 370/311 |

FOREIGN PATENT DOCUMENTS

JP 9-284826 10/1997

* cited by examiner

*Primary Examiner* — Ted Wang
(74) *Attorney, Agent, or Firm* — Fujitsu Patent Center

(57) ABSTRACT

A mobile radio apparatus receives a broadcast signal transmitted from at least one base-transceiver station corresponding to a cell around a position of the mobile radio apparatus, obtains from the received broadcast signal a cell identifier for the cell and a cell flag for identifying whether or not the cell is a small cell or a macro cell, stores the obtained cell identifier and cell flag in a cell list, confirms a service quality class for a service of call connection target communication, determines whether or not the service desires a high throughput by using the confirmed service quality class when the cell list includes a cell flag representing a small cell, selects a macro cell from the cell list when it is determined that the service does not desire a high throughput, and transmits a call connection request signal to a base-transceiver station corresponding to the selected macro cell.

12 Claims, 21 Drawing Sheets

| TYPE OF CELL | | COVERED SCOPE (TYPICAL EXAMPLE) |
|---|---|---|
| MACRO CELL | – | ~35km |
| SMALL CELL | MICRO CELL | ~2km |
|  | PICO CELL | ~200m |
|  | FEMTO CELL | SEVERAL TENS OF METERS |

F I G. 1

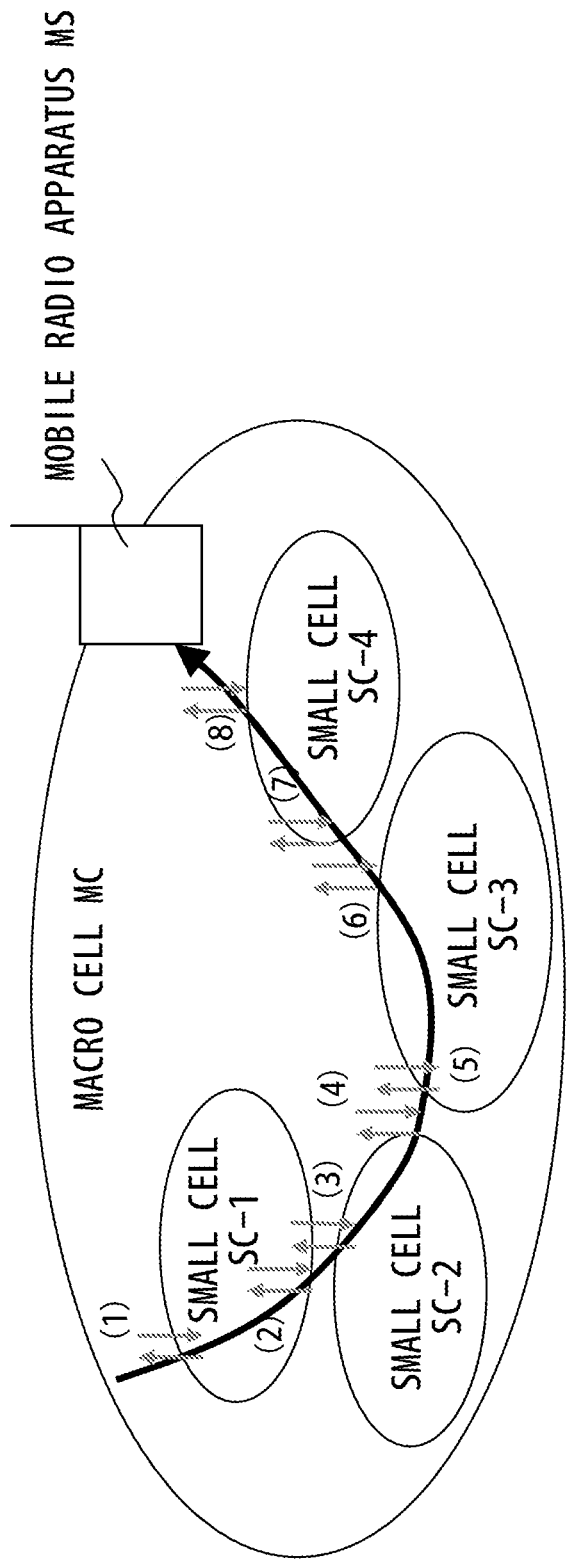
F I G. 2

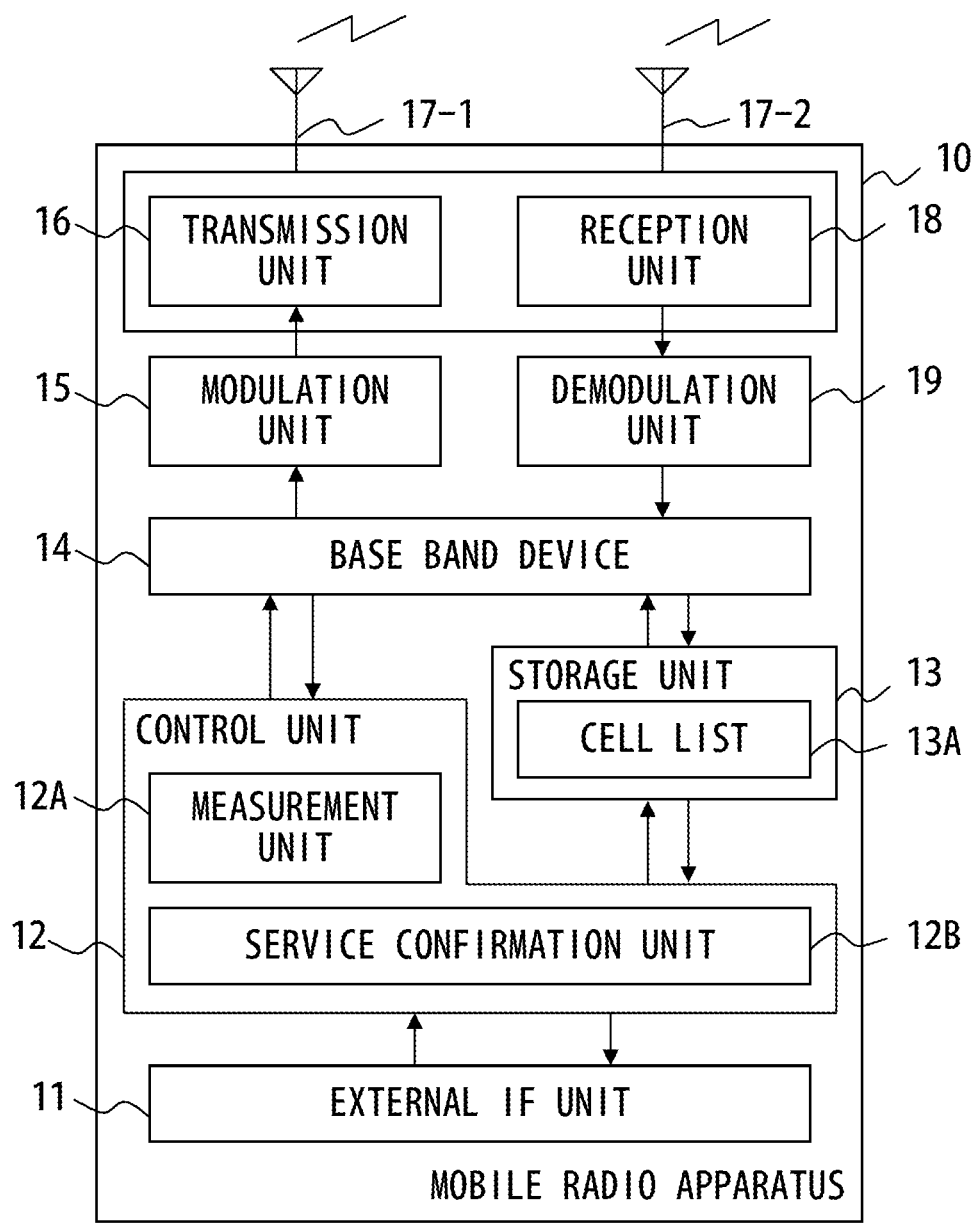
F I G. 4

| QCI | Resource Type | Priority | Service |
|---|---|---|---|
| 1 | GBR | 2 | TELEPHONE CALL |
| 2 | | 4 | VIDEOPHONE, GAME (REAL TIME), |
| 3 | | 3 | VIDEO VIA STREAMING, etc. |
| 4 | | 5 | |
| 5 | Non-GBR | 1 | WEB, E-MAIL, etc. |
| 6 | | 6 | |
| 7 | | 7 | |
| 8 | | 8 | |
| 9 | | 9 | |

F I G. 5

| CELL ID | RECEIVED ELECTRIC FIELD STRENGTH (dBm) | CELL FLAG |
|---|---|---|
| 5 | ○○○ | 1 |
| 3 | △△△ | 0 |
| 1 | ××× | 0 |
| 7 | □□□ | 0 |
| ⋮ | ⋮ | ⋮ |

F I G. 6

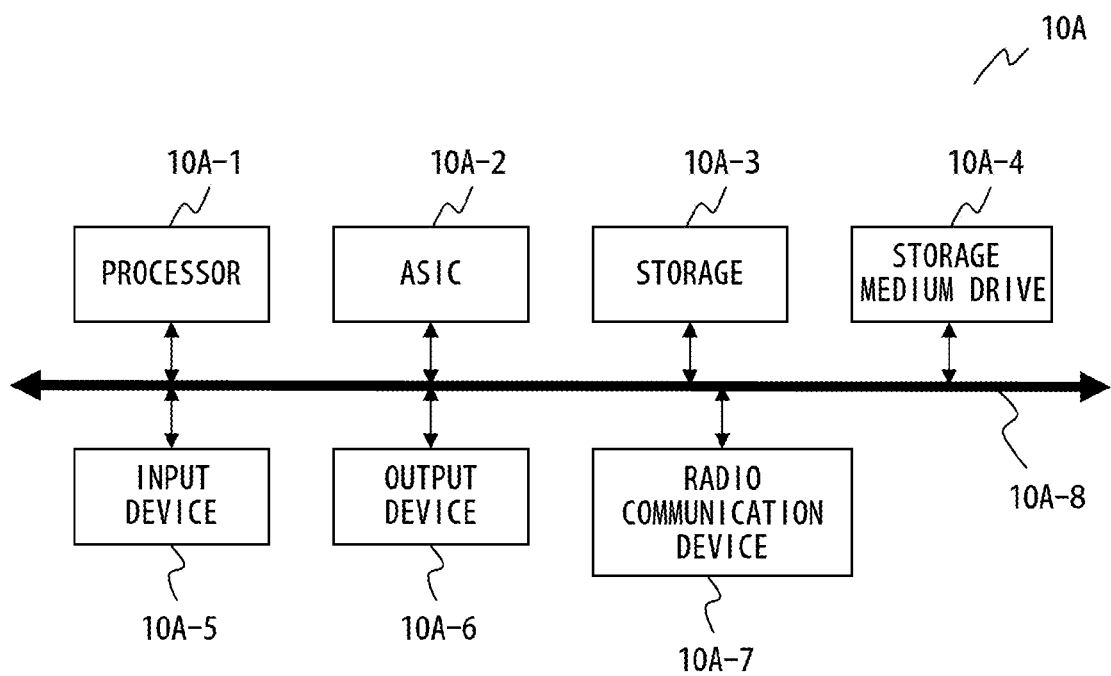
F I G. 7

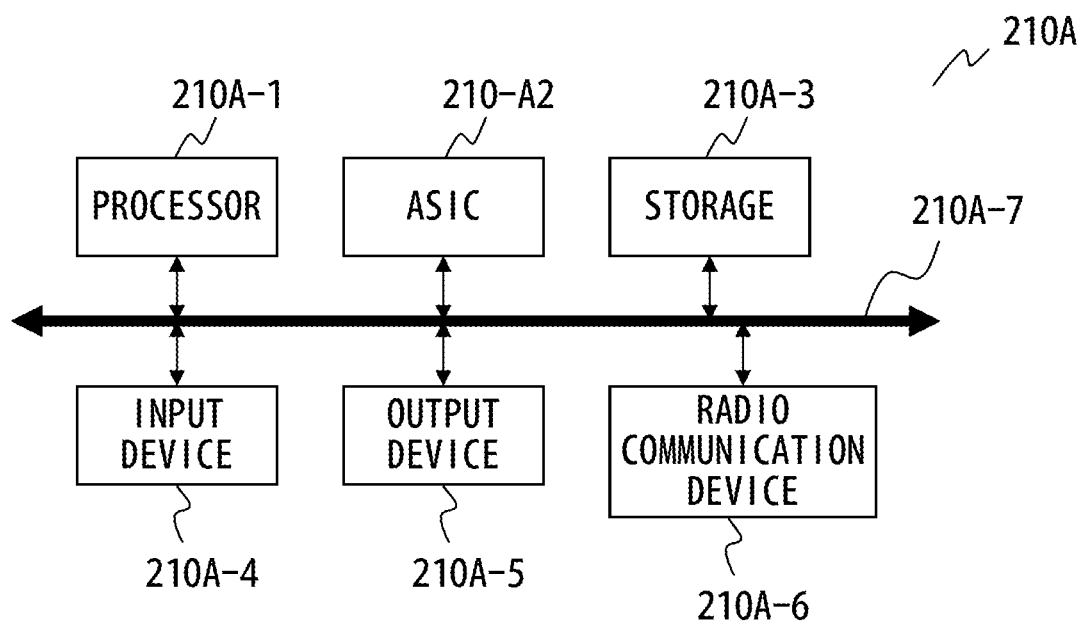
F I G. 9

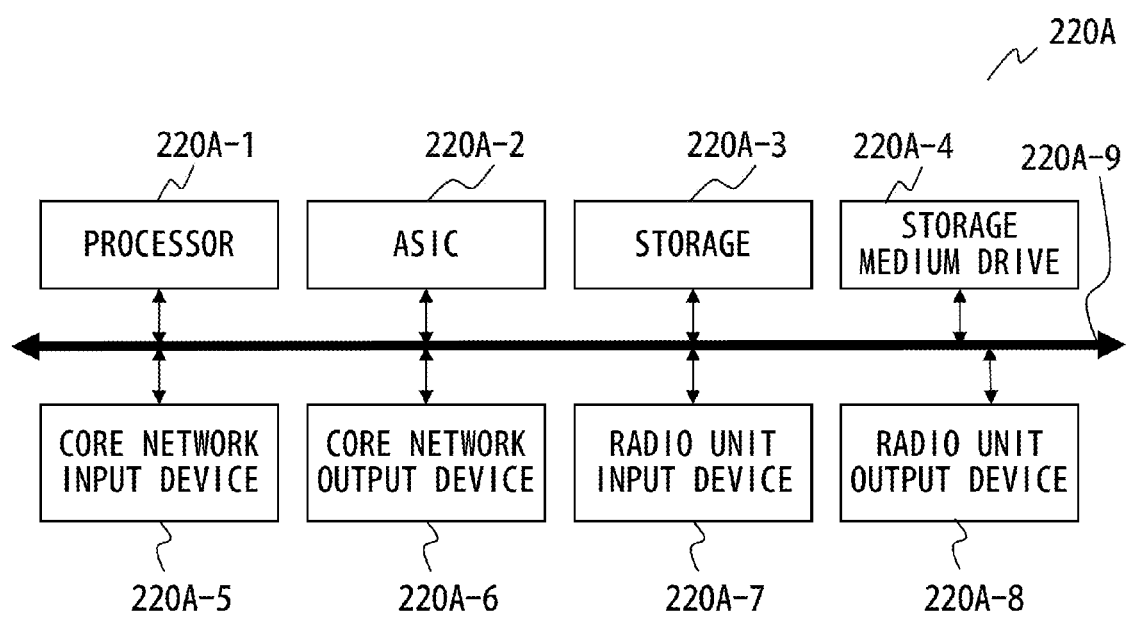
F I G. 10

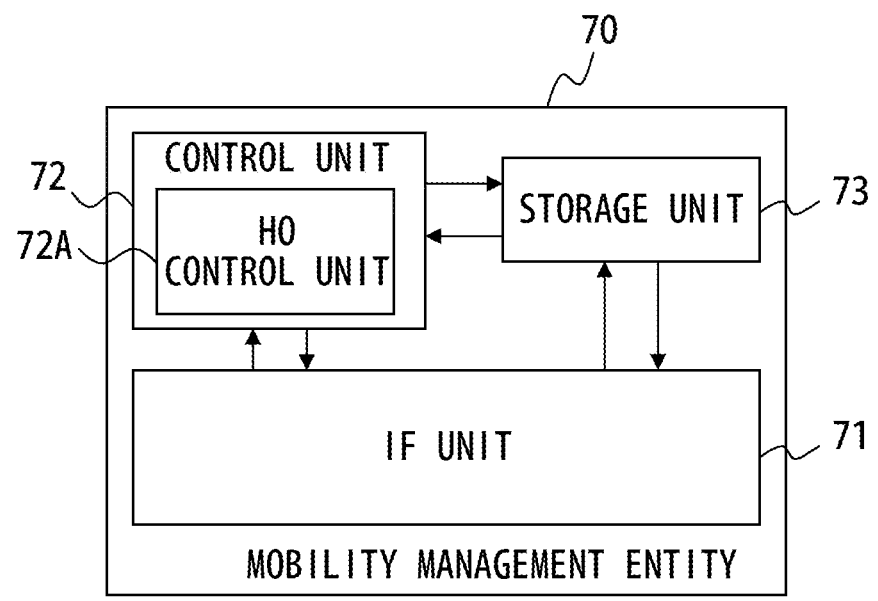
F I G. 11

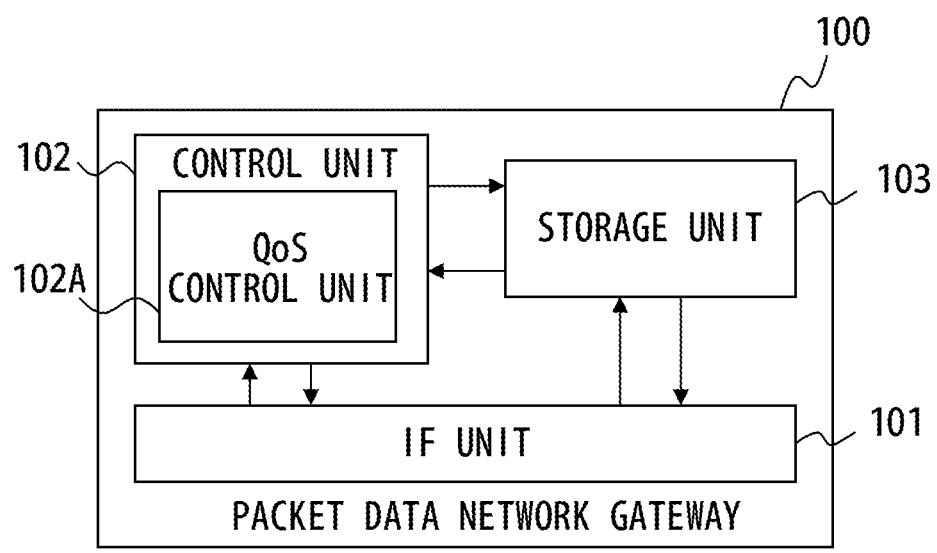
F I G. 1 3

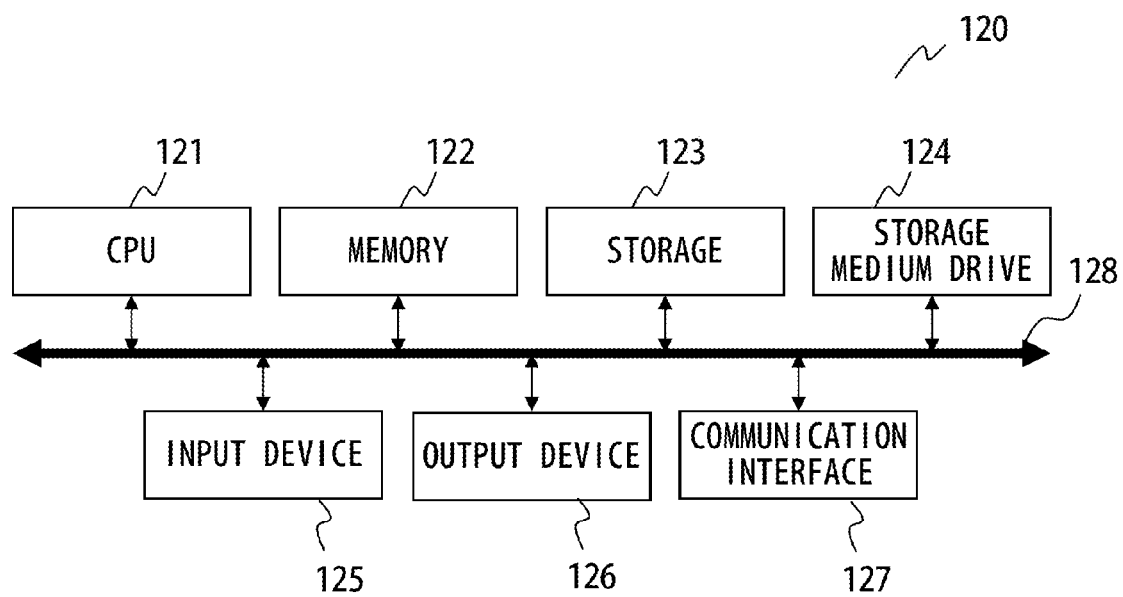
F I G. 14

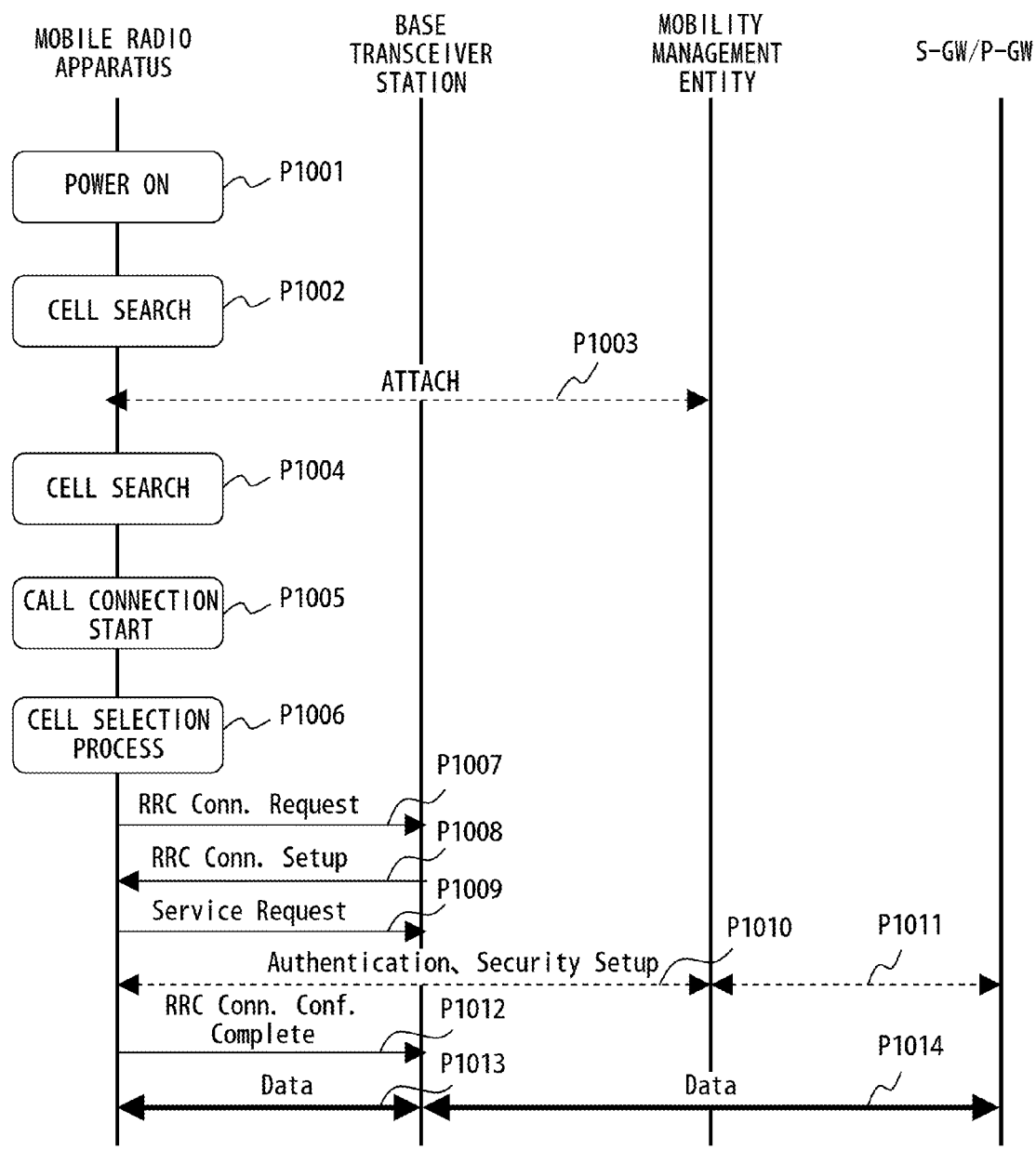
F I G. 1 5

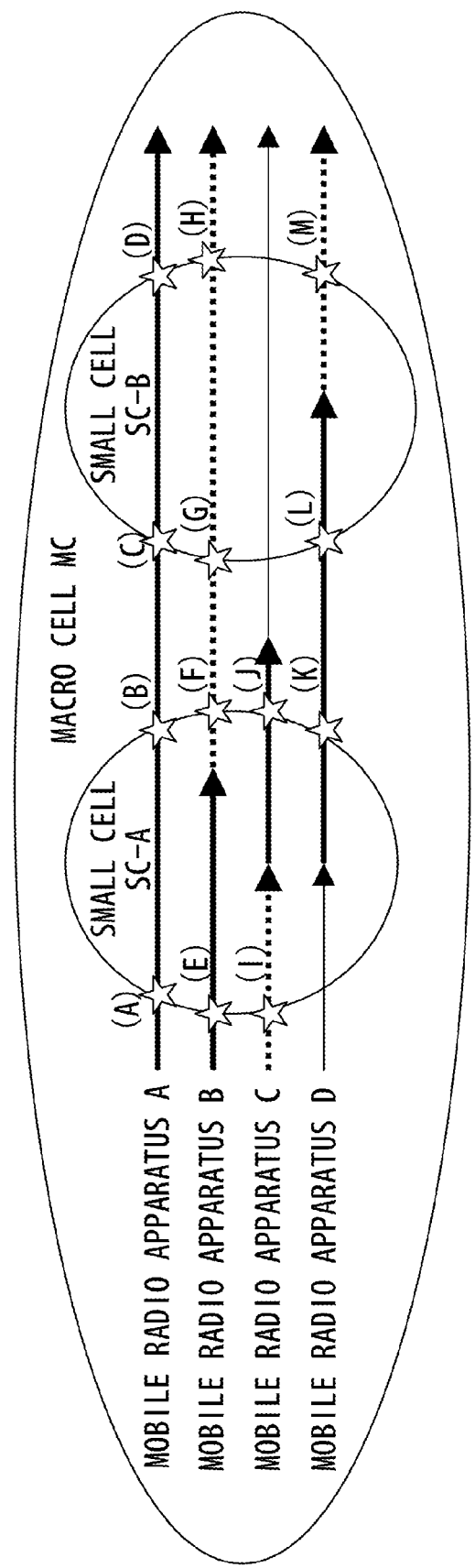
F I G. 1 8

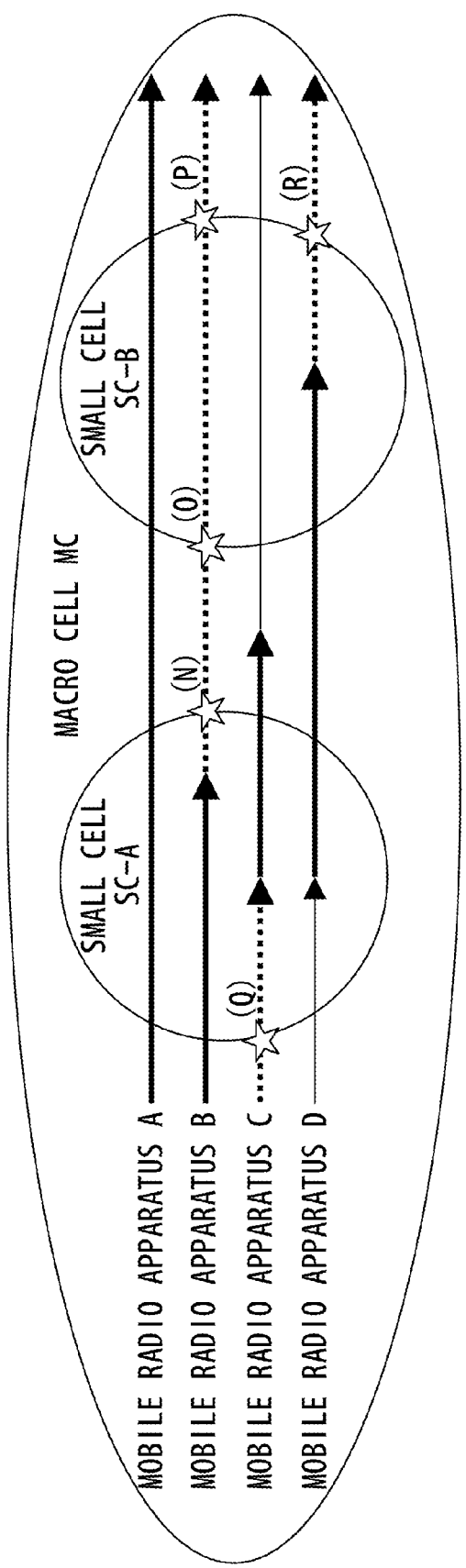
F I G. 19

| CELL ID | DATE | DAY OF WEEK | TIME OF DAY | CELL FLAG |
|---|---|---|---|---|
| ⋮ | | | | |
| 236 | 6/20 | THURSDAY | 0:00 | OFF |
| | | | ⋮ | ⋮ |
| | | | 5:00 | OFF |
| | | | 6:00 | ON |
| | | | 7:00 | ON |
| | | | 8:00 | ON |
| | | | 9:00 | OFF |
| | | | ⋮ | ⋮ |
| | 6/21 | FRIDAY | 0:00 | OFF |
| | | | ⋮ | ⋮ |
| ⋮ | | | | ⋮ |

FIG. 20

MOBILE RADIO APPARATUS AND MOBILE COMMUNICATION SYSTEM

CROSS-REFERENCE TO RELATED APPLICATIONS

This application is based upon and claims the benefit of priority of the prior Japanese Patent Application No. 2014-019089, filed on Feb. 4, 2014, the entire contents of which are incorporated herein by reference.

FIELD

The embodiments discussed herein are related to a mobile radio apparatus, a mobile communication system and a cell-selection control program.

BACKGROUND

In recent years, the amount of communications traffic has increased accompanying the spread of mobile phones known as smart phones and information communication terminal apparatuses known as tablet terminals. In order to respond to the traffic increase, a radio communication system based on Long Term Evolution (LTE) adopting Orthogonal Frequency Division Multiple Access (OFDMA) as the wireless accessing scheme is being developed. OFDMA is a wireless accessing scheme which has a frequency usage efficiency higher than that of Code Division Multiple Access (CDMA), which is tolerant of noise, resulting in less disconnection during calls. Because of this, LTE can be considered to be a standard for a radio communication scheme that realizes an increase in the capacity of radio communication systems and can also be considered to be a standard for a radio communication scheme that is capable of responding to increases in traffic.

Also, in order to respond to increases in traffic, development of heterogeneous networks in which macro cells and small cells are both used is discussed. FIG. 1 illustrates exemplary types of cells.

A cell is a section in a communication area that is covered by one base-transceiver station or by one remote-radio head (RRH) in a remote base station. A remote base station is a base-transceiver station that is also known as a remote installation base station, and includes a base band unit (BBU), which executes processes of base band signals etc., and at least one remote-radio head (RRH) for transmitting and receiving radio signals via an antenna. Cells are classified into macro cells or small cells in accordance with the sizes of communication districts that are covered (covered scope). A macro cell is a cell whose communication district is large, and has a cell radius of 35 kilometers or smaller in the example illustrated in FIG. 1. A small cell is a cell whose communication district is small, and has the cell radius of 2 kilometers or smaller in the example illustrated in FIG. 1. Also, as illustrated in FIG. 1, small cells can be classified further into micro cells (with a cell radius of 2 kilometers or smaller, for example), pico cells (with a cell radius of 200 meters or smaller, for example) and femto cells (with the cell radius of several tens of meters or smaller, for example).

Small cells have communication districts smaller than those of macro cells, and accordingly the number of mobile phones or information communication terminal apparatuses existing in a small cell may be small. As a result of this, the use of small cells suppresses the traffic per unit area and makes it easy to secure a high cell throughput. Therefore, according to a heterogeneous network having small cells formed in a district in which mobile phones or information communication terminal apparatuses may be concentrated in addition to having conventional macro cells with large communication districts, it is possible to increase the capacity of a radio communication system in response to traffic increases that can occur locally.

However, in a heterogeneous network as described above, the opportunities for a handover to occur, which occurs when a mobile phone or an information communication terminal apparatus moves from one cell to another, may increase in comparison with a communication network in which the communication area has only macro cells. FIG. 2 illustrates a handover that may occur in a heterogeneous network. In the example illustrated in FIG. 2, four small cells SC-1 through SC-4 are included in macro cell MC. Mobile radio apparatus MS illustrated in FIG. 2 is an example of a mobile phone and an information communication terminal apparatus described above.

When, as illustrated in FIG. 2, a user carrying a mobile radio apparatus MS that is conducting communications has moved, as depicted by a thick arrow, a handover (1) from macro cell MC to small cell SC-1 and a handover (2) from small cell SC-1 to macro cell MC may occur. Next, a handover (3) from macro cell MC to small cell SC-2, a handover (4) from small cell SC-2 to macro cell MC may occur. In a similar manner, a handover (5) through a handover (8) occur subsequently. As described above, in a heterogeneous network in which small cells are arranged in a macro cell, there are more opportunities for a handover to occur than there are in a communication network in which the communication area has only macro cells. Increases in opportunities for a handover to occur may lead to an increase in the risk of call losses. Therefore, in order to suppress the risk of call losses, it is preferable that opportunities for unnecessary handovers be suppressed as much as possible.

Regarding methods of switching channels of mobile communications, the following techniques are known. Specifically, it is determined whether a personal mobile phone is moving at a high speed or low speed on the basis of the degree by which the electric field strength of the communicating channel decreases. When it is determined that the personal mobile phone is moving at a high speed, the radio base station having an electric field strength equal to or higher than a specified value and having the electric field strength increasing the most sharply is selected so as to switch the channel.

PRIOR ART DOCUMENTS

Patent Documents

Patent Document 1: Japanese Laid-open Patent Publication No. 9-284826

SUMMARY

According to one aspect of the embodiments, a mobile radio apparatus includes a measurement unit, a service confirmation unit, and a control unit. The measurement unit is configured to receive a broadcast signal transmitted from at least one base-transceiver station corresponding to a cell around a position of the mobile radio apparatus, to obtain a cell identifier, contained in the received broadcast signal, for identifying the cell around the position of the mobile radio apparatus, and a cell flag, contained in the received broadcast signal, for identifying whether or not the cell around the position of the mobile radio apparatus is a small cell or a macro cell, and to store the obtained cell identifier and cell flag in a cell list. The service confirmation unit is configured to confirm a service quality class for a service of call connection target communication. The control unit is configured to determine whether or not the service of the call connection target communication is a service that desires a high throughput by using the service quality class confirmed by the service confirmation unit when the cell list includes a cell flag representing a small cell, to select a macro cell from the cell list when it is determined that the service of the call connection target communication is a service that does not desire a high throughput, and to transmit a call connection request signal to a base-transceiver station corresponding to the selected macro cell.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates exemplary types of cells;

FIG. 2 illustrates a handover that may occur in a heterogeneous network;

FIG. 4 illustrates an exemplary functional diagram of a mobile radio apparatus according to the first embodiment;

FIG. 5 illustrates exemplary QCIs;

FIG. 6 illustrates an exemplary cell list according to the first embodiment;

FIG. 7 illustrates an exemplary hardware configuration of a mobile radio apparatus according to the first embodiment;

FIG. 9 illustrates an exemplary hardware configuration of a radio apparatus according to the first embodiment;

FIG. 10 illustrates an exemplary hardware configuration of a radio control apparatus according to the first embodiment;

FIG. 11 illustrates an exemplary functional configuration of a mobility management entity according to the first embodiment;

FIG. 13 illustrates an exemplary functional diagram of a packet data network gateway according to the first embodiment;

FIG. 14 illustrates an exemplary hardware configuration of a control terminal apparatus according to the first embodiment;

FIG. 15 illustrates an exemplary sequence of a call connection process according to the first embodiment;

FIG. 18 explains an exemplary handover operation for a case where the cell selection control according to the first embodiment is not executed;

FIG. 19 explains an exemplary handover operation for a case where the cell selection control according to the first embodiment is executed;

FIG. 20 illustrates an example of a cell flag setting table according to the second embodiment.

DESCRIPTION OF EMBODIMENTS

Figure 3:
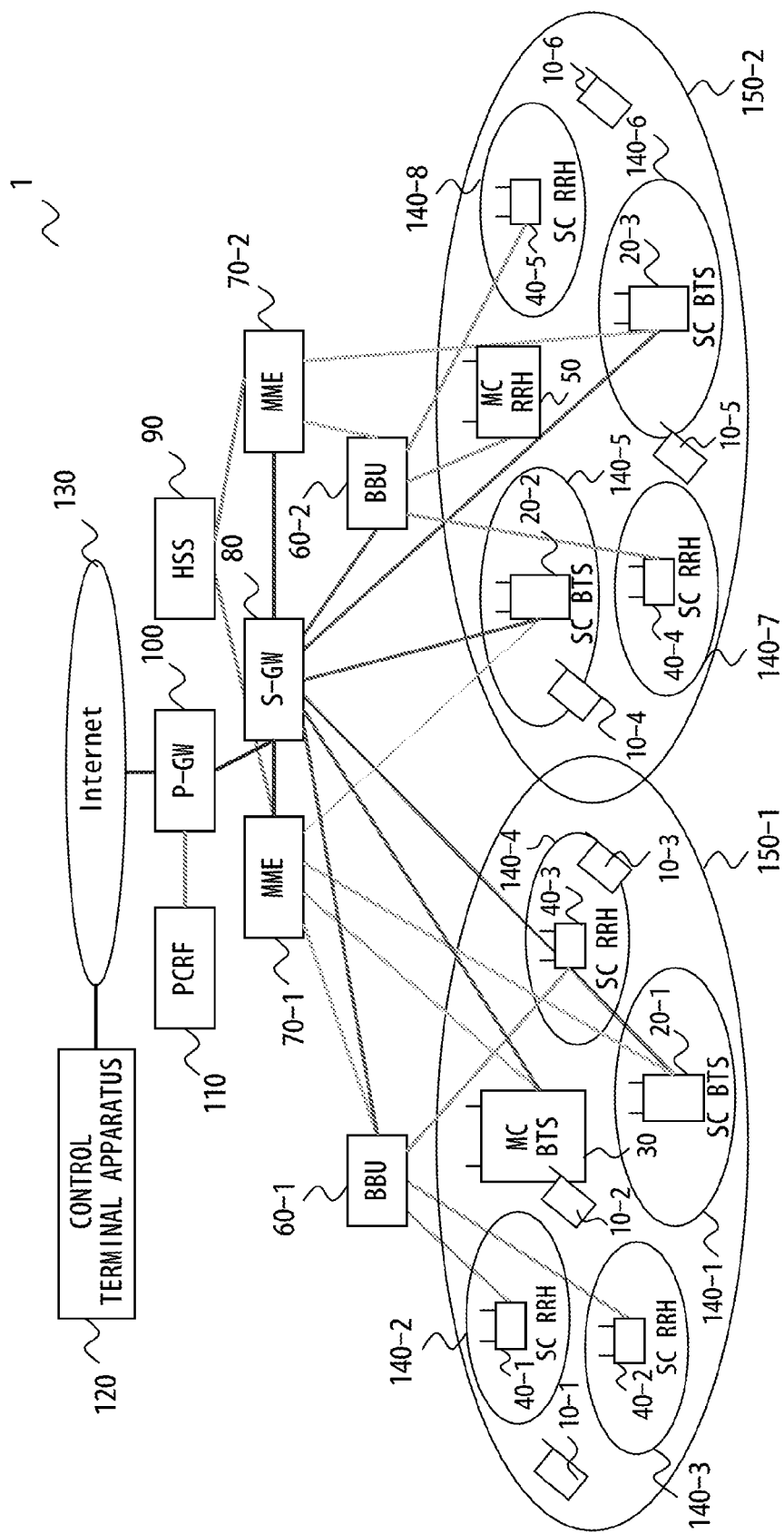
FIG. 3 illustrates an exemplary configuration of a mobile communication system according to a first embodiment.

Hereinafter, embodiments of the invention will be explained by referring to the drawings.

First Embodiment

FIG. 3 illustrates an exemplary configuration of a mobile communication system according to a first embodiment. As illustrated in FIG. 3, a mobile communication system 1 includes mobile radio apparatuses 10-1 through 10-6, base-transceiver stations for small cells (SC BTSs) 20-1 through 20-3 and base-transceiver stations for macro cell (MC BTSs) 30. The mobile communication system 1 includes remote-radio heads for small cells (SC RRHs) 40-1 through 40-5, a remote-radio head for macro cell (MC RRHs) 50, and base band units (BBUs) 60-1 and 60-2. The mobile communication system 1 includes mobility management entities (MMEs) 70-1 and 70-2, a serving gateway (S-GW) 80, a home subscriber server (HSS) 90, and a packet data network gateway (P-GW) 100. The mobile communication system 1 includes a policy-and-charging rule function (PCRF) 110, a control terminal apparatus 120, and Internet 130.

FIG. 3 illustrates small cells 140-1 through 140-8 and macro cells 150-1 and 150-2. In other words, the mobile communication system 1 constructs a heterogeneous network in which the communication area is covered by a plurality of macro cells, and also an arbitrary macro cell may include at least one small cell.

The small cells 140-1 through 140-4 are included in the macro cell 150-1. The small cell 140-1 is a cell in which the communication is covered by the base-transceiver station for small cell 20-1, and the small cells 140-2 through 140-4 are cells in which the communication is covered by the remote-radio heads for small cell 40-1 through 40-3, respectively. The base band unit 60-1 and the remote-radio heads for small cells 40-1 through 40-3 constitute a remote base station. The macro cell 150-1 is a cell in which the communication is covered by the base-transceiver station for macro cell 30.

The small cells 140-5 through 140-8 are included in the macro cell 150-2. The small cells 140-5 and 140-6 are cells in which the communications are covered by the base-transceiver stations for small cells 20-2 and 20-3, respectively, and the small cells 140-7 and 140-8 are cells in which the communications are covered by the remote-radio heads for small cells 40-4 and 40-5, respectively. The macro cell 150-2 is a cell in which the communication is covered by the remote-radio head for macro cell 50. The base band unit 60-2, remote-radio heads for small cells 40-4 and 40-5, and the remote-radio head for macro cell 50 constitute a remote base station.

FIG. 3 illustrates a mobile communication system based on LTE as an example of the mobile communication system 1 according to the first embodiment. However, FIG. 3 illustrates an example of the mobile communication system 1 according to the embodiment and the mobile communication system 1 according to the embodiment may be based on a different radio communication scheme. Also, the numbers of the respective apparatuses illustrated in FIG. 3 are exemplary, and the numbers of the respective apparatuses included in the mobile communication system 1 according to the embodiment may be arbitrary. In the explanations below, when distinctions are not particularly made between a plurality of apparatuses of the same type, the hyphens and the numbers that follow in the numerals denoting the apparatuses of the same type will be omitted. For example, when distinctions are not particularly made between the six mobile radio apparatuses 10-1 through 10-6, they are referred to as the mobile radio apparatus(es) 10.

In the explanations below, a combination of the remote-radio head for small cell 40 and the remote-radio head for macro cell 50 may be referred to as a remote-radio head in some cases. A combination of such a remote-radio head and the base band unit 60 may be referred to as a remote base station in some cases. A combination of such a remote base band station, the base-transceiver station for small cell 20 and the base-transceiver station for macro cell 30 may be referred to as a base-transceiver station in some cases.

In the mobile communication system 1 illustrated in FIG. 3, the mobility management entities 70, the serving gateway 80, the home subscriber server 90, and the packet data network gateway 100 are included in a core network. A core network is for example an Evolved Packet Core (EPC) defined by the Third Generation Partnership Project (3GPP).

The mobile radio apparatus 10 includes user equipment (UE) defined by 3GPP, and is for example a mobile phone known as a smart phone or an information communication terminal apparatus known as a tablet terminal. FIG. 4 illustrates an exemplary functional diagram of a mobile radio apparatus according to the first embodiment. As illustrated in FIG. 4, the mobile radio apparatus 10 includes an external interface (I/F) unit 11, a control unit 12, a storage unit 13, a base band device 14, a modulation unit 15, a transmission unit 16, antennas 17 (17-1 and 17-2), a reception unit 18, and a demodulation unit 19.

The external interface unit 11 is an interface used by a user of the mobile radio apparatus 10 to input an instruction directed to the mobile radio apparatus 10. Also, the external interface unit 11 is an interface that displays results of processes executed by the mobile radio apparatus 10.

The control unit 12 controls all of the operations of the mobile radio apparatus 10. Also, the control unit 12 controls call connection for newly starting a communication and also controls call processes such as handovers etc. that are executed after the start of communication. For example, the control unit 12 processes an instruction input by a user through the external interface unit 11. The control unit 12 transmits to the base band device 14 data to be transmitted to a base-transceiver station. The control unit 12 receives a base band signal obtained as a result of the base band device 14 processing a radio signal received from a base-transceiver station via the antennas 17. The control unit 12 makes the storage unit 13 store the result of processing a received base band signal, and makes the external interface unit 11 display the process result.

Also, the control unit 12 includes a measurement unit 12A and a service confirmation unit 12B. The measurement unit 12A receives a broadcast signal transmitted from a base-transceiver station around the position of the mobile radio apparatus 10 via the antennas 17, the reception unit 18, the demodulation unit 19, and the base band device 14. A broadcast signal transmitted from a base-transceiver station is for example a pilot signal such as a Downlink Reference Signal defined by 3GPP. A broadcast signal includes broadcast information such as an operation parameter etc. that is necessary commonly for communications in all the mobile radio apparatuses 10 in the cell, and includes a cell identifier (ID) for identifying each cell and a cell flag for identifying whether or not the cell is a small cell or a macro cell. The measurement unit 12A measures the radio quality of the received broadcast signal. The measured radio quality includes for example the received electric field strength and the carrier-wave-signal-to-interference noise ratio of a broadcast signal. The measurement unit 12A obtains a cell identifier and a cell flag contained in a received broadcast signal. The measurement unit 12A makes a cell list 13A in the storage unit 13 store the obtained cell identifier and cell identification flag and the measured radio quality. The above process executed by the measurement unit 12A for generating and updating the cell list 13A is executed upon a cell search, which is conducted periodically.

The service confirmation unit 12B confirms the service quality class to which the service of the communication that the mobile radio apparatus 10 is going to newly start belongs or to which the service with which the mobile radio apparatus 10 is currently communicating belongs. Specifically, the service confirmation unit 12B confirms the quality of service (QoS) class Identifier (QCI) to which the service of the communication that the mobile radio apparatus 10 is going to newly start belongs. Also, the service confirmation unit 12B confirms the QCI with which the service that the mobile radio apparatus 10 is currently communicating belongs. For example, the QCIs as illustrated in FIG. 5 are defined by 3GPP. FIG. 5 illustrates QCIs as examples.

Examples of services communicated between the mobile radio apparatus 10 and the base-transceiver station include telephone calls, mail, web viewing, videophones, real-time games, videos via streaming, etc. These services are roughly classified into services having a Guaranteed Bit Rate (GBR) and services not having a GBR, as illustrated in FIG. 5. For services having GBRs, the highest service quality classes, i.e., the first through fourth QCIs, are set. For services not having GBRs, lower service quality classes, i.e., the fifth through ninth QCIs, are set. The service confirmation unit 12B confirms the QCI for the service of the communication that the mobile radio apparatus 10 is going to start newly or the service with which the mobile radio apparatus 10 is currently communicating. The service confirmation unit 12B reports the confirmed service quality class, i.e., the confirmed QCI, to the control unit 12.

The control unit 12 selects a base-transceiver station as a connection target in accordance with whether or not the service that is going to start the communication desires a high throughput. Also, the control unit 12 selects a base-transceiver station as a connection target, i.e., a base-transceiver station as a handover destination, in accordance with whether or not the service being communicated with desires a high throughput. Specifically, in accordance with whether or not the service quality class reported by the service confirmation unit 12B is a class (rank) that desires a high throughput, the control unit 12 selects a small cell or a macro cell from among cells recorded in the cell list 13A.

For example, in the example of the definitions of the QCIs illustrated in FIG. 5, among the services having GBRs, all the services except for the audio, whose QCI is in the first place, i.e., the services whose QCIs are in the second through fourth places, have large data sizes and thus desire a high throughput, and accordingly GBRs are defined. As described above, a small cell has a communication district smaller than that of a macro cell, and accordingly fewer mobile phones and information communication terminal apparatuses may exist in it. As a result of this, using small cells suppresses the traffic per unit area and makes it easy to secure a high cell throughput. Accordingly, the control unit 12 selects cells remaining after excluding small cells from all the cells in the cell list 13A, i.e., selects macro cells as connection target cells for communication of services that do not always desire a high throughput. In the example illustrated in FIG. 5, the services that do not always desire a high throughput are the services whose QCIs are in the first place or in one of the fifth through ninth places. Meanwhile, the control unit 12 selects cells with a high radio quality as connection target cells from among all the cells in the cell list 13A for communication of services that desire a high throughput. In the example illustrated in FIG. 5, services requiring a high throughput are the services whose QCIs are in one of the second through fourth places.

When the mobile radio apparatus 10 starts communication newly, the control unit 12 transmits a connection request signal to the base-transceiver station corresponding to the selected connection target cell. Also, when the mobile radio apparatus 10 is in communication, the measurement unit 12A transmits a radio quality report signal containing the radio quality corresponding to the selected connection target cell, i.e., the handover destination cell, to the connected base-transceiver station, i.e., the base-transceiver station corresponding to the handover source cell.

The storage unit 13 stores a processing program and data to be executed by the control unit 12 and the base band device 14 and data that was processed by the control unit 12 and the base band device 14. The storage unit 13 includes the cell list 13A in which information relating to a cell around the position of the mobile radio apparatus 10 is recorded. FIG. 6 illustrates an exemplary cell list according to the first embodiment. FIG. 6 illustrates a cell list for a case in which the radio quality of a broadcast signal measured by the measurement unit 12A is the received electric field strength of the broadcast signal. As illustrated in FIG. 6, a cell identifier, a received electric field strength, and a cell flag are recorded in an associated manner in each row in the cell list 13A in accordance with the broadcast signal received from the base-transceiver station around the position of the mobile radio apparatus 10. In the cell list 13A, the pieces of information are recorded in the order of radio quality, e.g., in the order starting from the highest received electric field strength. Regarding a cell flag, "1", represents a small cell and "0" represents a macro cell. The cell list 13A is updated in accordance with radio request measurements periodically executed by the measurement unit 12A when searching for cells.

The base band device 14 receives, from the control unit 12, a data signal transmitted to the base-transceiver station, and performs a base band process on the received data signal. The processed base band signal is modulated by the modulation unit 15 and is transmitted by the transmission unit 16 to the base-transceiver station via the antennas 17. The radio signal received by the reception unit 18 via the antennas 17 from the base-transceiver station is demodulated by the demodulation unit 19. The demodulated signal receives a base band process from the base band device 14, and is transmitted to the control unit 12.

FIG. 7 illustrates an exemplary hardware configuration of a mobile radio apparatus according to the first embodiment. As illustrated in FIG. 7, a mobile radio apparatus 10A according to the first embodiment includes a processor 10A-1, an application specific integrated circuit (ASIC) 10A-2, a storage 10A-3, a storage medium drive 10A-4, an input device 10A-5, an output device 10A-6, a radio communication device 10A-7, and a bus 10A-8. The processor 10A-1, the ASIC 10A-2, the storage 10A-3, the storage medium drive 10A-4, the input device 10A-5, the output device 10A-6 and the radio communication device 10A-7 are connected to each other via the bus 10A-8.

The processor 10A-1 is a logic circuit that performs arithmetic processes, such as a central processing unit (CPU). The ASIC 10A-2 is a circuit such as for example a Field Programmable Gate Array (FPGA), a Large Scale Integration (LSI), etc. The processor 10A-1 and the ASIC 10A-2 correspond to the control unit 12 and the base band device 14.

The storage 10A-3 is a device that stores a processing program executed by the processor 10A-1 and the ASIC 10A-2, data used for processing, and data resulting from processing. The storage 10A-3 corresponds to the storage unit 13.

The storage medium drive 10A-4 reads a program and data recorded in a recording medium and/or writes data processed by the processor 10A-1 and the ASIC 10A-2 to a recording medium. A recording medium is for example a Compact Disk Read Only Memory (CD-ROM), a Digital Versatile Disk (DVD), a Universal Serial Bus (USB) memory, a flash memory, etc.

The input device 10A-5 is a device to be used by users of the mobile radio apparatus 10A to input instructions to the mobile radio apparatus 10A, and is for example a keyboard, a mouse, a touch panel, etc. The output device 10A-6 is a device that displays results of processes executed by the processor 10A-1 and the ASIC 10A-2, and is for example a liquid crystal display. The input device 10A-5 and the output device 10A-6 correspond to the external interface unit 11.

The radio communication device 10A-7 is a device that processes data to be transmitted to a base-transceiver station and transmits a radio signal in accordance with instructions from the processor 10A-1 and the ASIC 10A-2. Also, the radio communication device 10A-7 is a device that processes a radio signal received from a base-transceiver station and outputs data to the processor 10A-1 and the ASIC 10A-2. The radio communication device 10A-7 corresponds to the modulation unit 15, the transmission unit 16, the antennas 17, the reception unit 18, and the demodulation unit 19.

Figure 8:
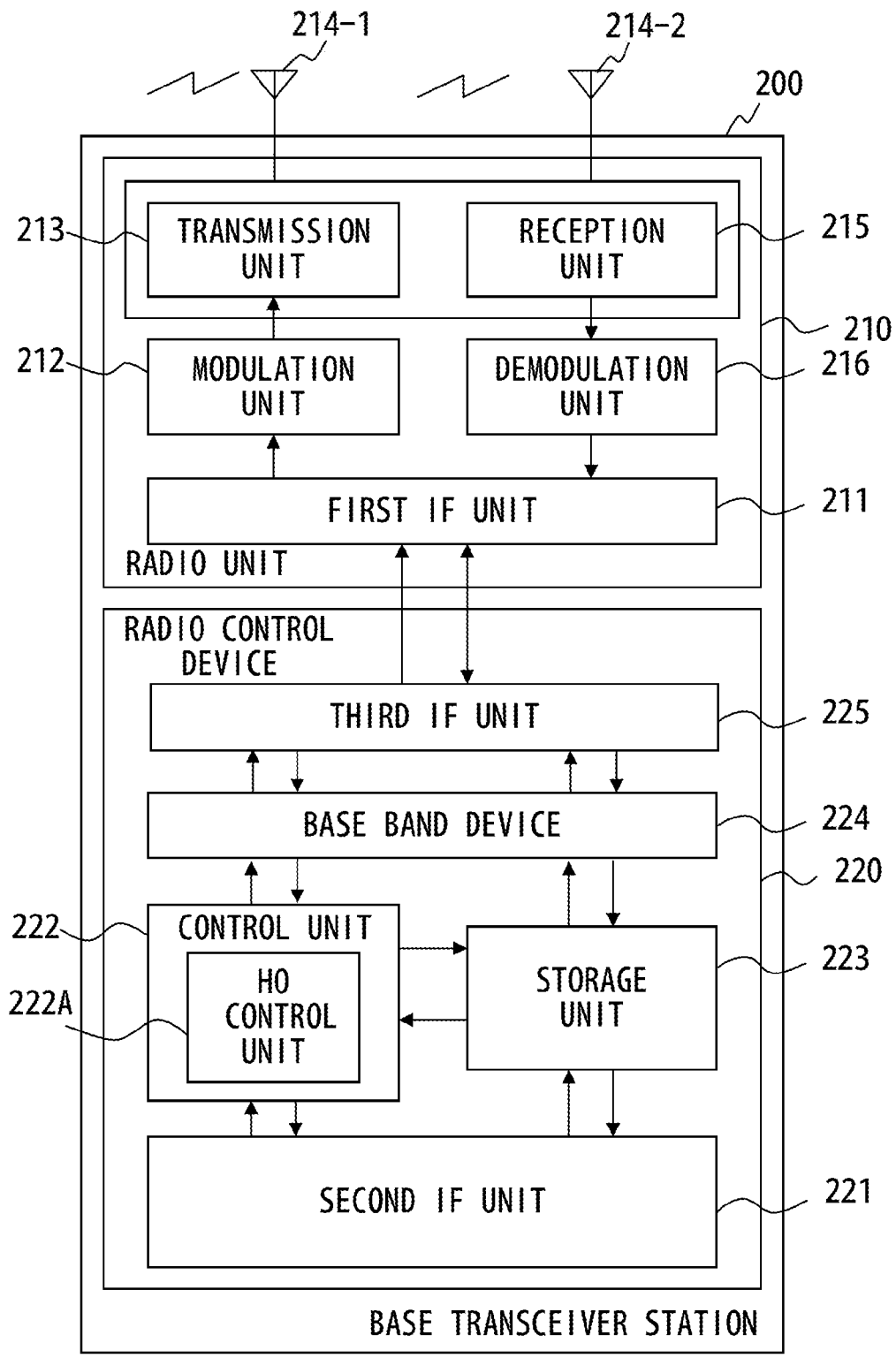
FIG. 8 illustrates an exemplary function configuration of a base-transceiver station according to the first embodiment.

A remote base station including remote-radio heads such as the base-transceiver station for small cell 20, the base-transceiver station for macro cell 30, the remote-radio head for small cell 40 and the remote-radio head for macro cell 50, and including the base band unit 60 is for example a base-transceiver station such as an evolved Node B (eNB) etc. defined by 3GPP. FIG. 8 illustrates an exemplary function configuration of a base-transceiver station according to the first embodiment.

As illustrated in FIG. 8, a base-transceiver station 200 according to the first embodiment includes a radio apparatus 210 and a radio control apparatus 220. The radio apparatus 210 may correspond to a remote-radio head such as the remote-radio head for a small cell 40 and the remote-radio head for a macro cell 50. The radio control apparatus 220 may correspond to the base band unit 60. Note that although FIG. 8 illustrates one radio apparatus 210, a plurality of radio apparatuses 210 may be included in the base-transceiver station 200.

The radio apparatus 210 includes a first interface (IF) unit 211, a modulation unit 212, a transmission unit 213, antennas 214 (214-1 and 214-2), a reception unit 215, and a demodulation unit 216.

The first interface unit 211 is a device used by the radio apparatus 210 to transmit signals to and receive signals from the radio control apparatus 220. The first interface unit 211 and a third interface unit 225 of the radio control apparatus 220 are connected via an optical cable and may be based on a prescribed standard such as Common Public Radio Interface (CPRI).

The modulation unit 212 modulates a base band signal received via the first interface unit 211 from the radio control apparatus 220. The transmission unit 213 transmits a radio signal modulated by the modulation unit 212 to the mobile radio apparatus 10 via the antennas 214.

The reception unit 215 receives a radio signal transmitted from the mobile radio apparatus 10 via the antennas 214. The demodulation unit 216 demodulates a radio signal received by the reception unit 215, and transmits the demodulated signal to the radio control apparatus 220 via the first interface unit 211.

The radio control apparatus 220 includes a second interface (IF) unit 221, a control unit 222, a storage unit 223, a base band device 224, and the third interface (IF) unit 225.

The second interface unit 221 is a device used by the mobility management entities 70, the serving gateway 80, and the radio control apparatus 220 to transmit and receive signals. The third interface unit 225 is a device used by the radio control apparatus 220 to transmit signals to and receive signals from the radio apparatus 210.

The control unit 222 controls all of the operations of the base-transceiver station 200. The control unit 222 controls processes related to call connection to the mobile radio apparatus 10. The control unit 222 includes a handover (HO) control unit 222A that controls handovers. For example, the control unit 222 performs a call connection process with respect to the mobile radio apparatus 10 in accordance with a connection request signal received from the mobile radio apparatus 10. The control unit 222 performs control in such a manner that user packet data received from the serving gateway 80 via the second interface unit 221 is processed and the processed user packet data is transmitted to the mobile radio apparatus 10. The handover control unit 222A transmits a radio quality measurement instruction signal to the mobile radio apparatus 10 and determines a connection-destination base-transceiver station (or remote-radio head) used when a handover is conducted.

The storage unit 223 stores a processing program and data to be executed by the control unit 222 and the base band device 224 and data that was processed by the control unit 222 and the base band device 224. The storage unit 223 stores a cell identifier of a cell whose communication is covered by the base-transceiver station 200 and a flag for identifying whether or not that cell is a small cell or a macro cell. When for example the base-transceiver station 200 includes a plurality of radio apparatuses 210, and there are a plurality of cells that are respectively covered by the plurality of radio apparatuses 210, the cell identifiers and cell flags of the plurality of cells are stored in the storage unit 223. Cell identifiers and cell flags may be stored in the storage unit 223 before the start of the operation of the base-transceiver station 200. Also, a cell flag may be transmitted from the control terminal apparatus 120 immediately after the start of the base-transceiver station 200 and/or during the operation of the base-transceiver station 200, and a cell flag received by the base-transceiver station 200 may be stored in the storage unit 223.

The base band device 224 receives from the control unit 222 a data signal to be transmitted to the mobile radio apparatus 10, and performs a base band process on the received data signal. The base band device 224 transmits the processed base band signal to the radio apparatus 210 via the third interface unit 225. Also, the base band device 224 performs a base band process on a signal received from the radio apparatus 210 via the third interface unit 225, and transmits the processed base band signal to the control unit 222.

FIG. 9 illustrates an exemplary hardware configuration of a radio apparatus according to the first embodiment. As illustrated in FIG. 9, a radio apparatus 210A according to the first embodiment includes a processor 210A-1, an ASIC 210A-2, a storage 210A-3, an input device 210A-4, an output device 210A-5, a radio communication device 210A-6 and a bus 210A-7. The processor 210A-1, the ASIC 210A-2, the storage 210A-3, the input device 210A-4, the output device 210A-5 and the radio communication device 210A-6 are connected to each other via the bus 210A-7.

The processor 210A is a logic circuit that performs arithmetic processes, such as a central processing unit (CPU). The ASIC 210A-2 is a circuit such as for example an FPGA, an LSI, etc. The storage 210A-3 stores a processing program to be executed by the processor 210A and the ASIC 210A-2, data used for the processing, and data resulting from processing. The input device 210A-4 and the output device 210A-5 correspond to the first interface unit 211.

The radio communication device 210A-6 processes data received from the radio control apparatus 220 via the input device 210A-4 so as to generate a radio signal and transmit the generated radio signal to the mobile radio apparatus 10 in accordance with instructions from the processor 210A-1 and the ASIC 210A-2. Also, the radio communication device 210A-6 processes the radio signal received from the mobile radio apparatus 10 and transmits the processed data signal to the radio control apparatus 220 via an output device 210A-5. The radio communication device 210A-6 corresponds to the modulation unit 212, the transmission unit 213, the antennas 214, the reception unit 215, and the demodulation unit 216.

FIG. 10 illustrates an exemplary hardware configuration of a radio control apparatus according to the first embodiment. As illustrated in FIG. 10, a radio control apparatus 220A according to the first embodiment includes a processor 220A-1, an ASIC 220A-2, a storage 220A-3, and a storage medium drive 220A-4. Also, the radio control apparatus 220A includes a core network input device 220A-5, a core network output device 220A-6, a radio apparatus input device 220A-7, a radio apparatus output device 220A-8, and a bus 220A-9. The constituents 220A-1 through 220A-8 of the radio control apparatus 220A are connected to each other via the bus 220A-9.

The processor 220A-1 is a logic circuit that performs arithmetic processes, such as a CPU etc. The ASIC 10A-2 is a circuit such as for example an FPGA, an LSI, etc. The processor 220A-1 and the ASIC 220A-2 correspond to the control unit 222 and the base band device 224.

The storage 220A-3 is a device that stores a processing program executed by the processor 220A-1 and the ASIC 220A-2, data used for processing, and data resulting from processing. The storage 220A-3 corresponds to the storage unit 223.

The storage medium drive 220A-4 reads a program and data written in a recording medium and/or writes data processed by the processor 220A-1 and the ASIC 220A-2 to a recording medium. A recording medium is for example a CD-ROM, a DVD, a USB memory, a flash memory, etc.

The core network input device 220A-5 and the core network output device 220A-6 correspond to the second interface unit 221. The radio apparatus input device 220A-7 and the radio apparatus output device 220A-8 correspond to the third interface unit 225.

The mobility management entities 70 accommodate the base-transceiver stations 200 and establish and release a bearer, which is a route for user data packets, and perform position registration, paging, mobility control such as a handover etc., and authentication of the mobile radio apparatus 10 that is linked with the home subscriber server 90. FIG. 11 illustrates an exemplary functional configuration of a mobility management entity according to the first embodiment. As illustrated in FIG. 11, the mobility management entity 70 includes an interface (IF) unit 71, a control unit 72, and a storage unit 73.

The interface unit 71 is a device used by the base-transceiver station 200, the serving gateway 80 and the mobility management entity 70 to transmit and receive signals. The control unit 71 controls all of the operations of the mobility management entity 70, and executes the above-described processes performed by the mobility management entity 70. The control unit 71 includes the handover (HO) control unit 72A that controls a handover to the mobile radio apparatus 10 that is connected to the base-transceiver station 200. The storage unit 73 stores a processing program executed by the control unit 72, processing data, processing result data, etc.

Figure 12:
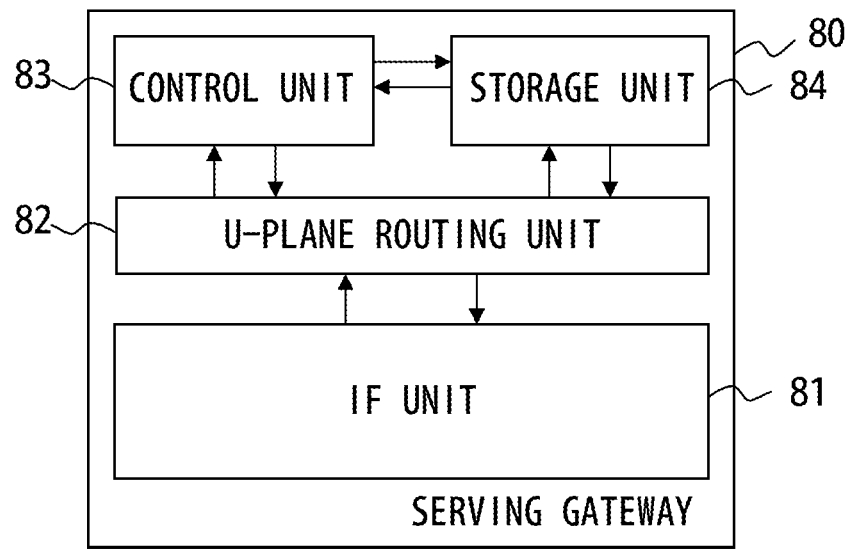
FIG. 12 illustrates an exemplary functional configuration of a serving gateway according to the first embodiment.

The serving gateway 80 performs a relay process of user packet data between the base-transceiver station 200 and the packet data network gateway 100. FIG. 12 illustrates an exemplary functional configuration of a serving gateway according to the first embodiment. As illustrated in FIG. 12, the serving gateway 80 includes an interface (IF) unit 81, a U-Plane routing unit 82, a control unit 83, and a storage unit 84.

The interface unit 81 is a device used by the base-transceiver station 200, the mobility management entity 70, the packet data network gateway 100, and the serving gateway 80 to transmit and receive signals. The control unit 83 controls all of the operations of the serving gateway 80. The U-Plane routing unit 82 selects a relay route of user packet data addressed to the mobile radio apparatus 10 and transmits the user packet data via the interface unit 81 in accordance with an instruction from the control unit 83. The storage unit 84 stores a processing program executed by the U-Plane routing unit 82 and the control unit 83, processing data, and processing result data.

The home subscriber server 90 is an apparatus including a database of subscriber information such as service information, authentication information, etc. used for providing an Internet Protocol (IP) Multimedia Subsystem (IMS) service.

The packet data network gateway 100 performs connection between the core network and a packet network outside the core network, such as the Internet 130. The packet data network gateway 100 performs assignment of Internet protocol (IP) addresses to the mobile radio apparatuses 10, user authentication related to the connection to a packet network upon the establishment of a bearer, Quality of Service (QoS) control in accordance with an instruction from the PCRF 110, generation of billing data, etc. FIG. 13 illustrates an exemplary functional diagram of a packet data network gateway according to the first embodiment. As illustrated in FIG. 13, the packet data network gateway 100 includes an interface (IF) unit 101, a control unit 102, and a storage unit 103.

The interface unit 101 is a device used by the packet data network gateway 100 to transmit a signal to and receive a signal from the serving gateway 80. The control unit 102 executes the above-described processes performed by the packet data network gateway 100. The control unit 102 includes a QoS control unit 102A that executes QoS control in accordance with an instruction received from the PCRF 110 via the interface unit 101. The QCIs illustrated in FIG. 5 are managed by the QoS control unit 102A. The storage unit 103 stores a processing program executed by the control unit 102, processing data, and processing result data.

The PCRF 110 is a policy control apparatus that controls policies such as QoS etc. applied in the packet data network gateway 100 and determines charge control rules.

The control terminal apparatus 120 controls the setting of the cell flag in each of the base-transceiver stations 200 in such a manner that the mobile radio apparatuses 10 can select whether the mobile radio apparatuses 10 are to be connected to the base-transceiver stations 200 covering small cells or the base-transceiver stations 200 covering macro cells, in accordance with the types of communication target services. The control terminal apparatus 120 holds cell flags for cells respectively covered by the base-transceiver stations 200 in the mobile communication system. The control terminal apparatus 120 transmits corresponding cell flags to the base-transceiver stations 200, and makes the base-transceiver stations 200 store the cell flags. The transmission of cell flags from the control terminal apparatus 120 to the respective base-transceiver stations 200 may be conducted immediately after the start of the operation of the base-transceiver stations 200 and may be conducted during operations of the base-transceiver stations 200. As described above, the mobile radio apparatuses 10 receive from the base-transceiver stations 200 broadcast signals containing cell flags stored in the base-transceiver station 200. The mobile radio apparatuses 10 determine whether or not cells around the positions of the mobile radio apparatuses 10 are small cells or macro cells in accordance with the received cell flags, and select connection target cells in accordance with the types of the services of the connection targets.

The control terminal apparatus 120 may be an information processing apparatus such as a computer. FIG. 14 illustrates an exemplary hardware configuration of a control terminal apparatus according to the first embodiment. As illustrated in FIG. 14, the control terminal apparatus 120 includes a CPU 121, a memory 122, a storage 123, a storage medium drive 124, an input device 125, an output device 126, a communication interface 127, and a bus 128. The CPU 121, the memory 122, the storage 123, the storage medium drive 124, the input device 125, the output device 126, and the communication interface 127 are connected to each other via the bus 128.

The CPU 121 is a logic circuit that performs arithmetic processes. The memory 122 is a main storage unit that the CPU 121 can directly access, and temporarily stores a program being executed by the CPU 121 and data being processed. The memory 122 is for example a Random Access Memory (RAM). The storage 123 is for example a hard disk drive (HDD). The storage 123 stores various types of programs and data executed by the CPU 121. The storage medium drive 124 is a device that reads data recorded in a recording medium and/or writes data processed by the CPU 121 to a recording medium. A recording medium is for example a CD-ROM, a DVD, a USB memory, a flash memory, etc.

The input device 125 is a device used by users of the control terminal apparatus 120 to input an instruction to the control terminal apparatus 120, and is for example a keyboard, a mouse, a touch panel, etc. The output device 126 is a device that displays a result of processing performed by the processor 121, and is for example a liquid crystal display. The communication interface 127 is a device that achieves connection to an external packet network such as the Internet 130.

An example of a cell selection process, executed by the mobile radio apparatus 10, according to the first embodiment will be explained by referring to two cases, one in which the mobile radio apparatus 10 newly starts communication via the base-transceiver station 200 and the other in which the mobile radio apparatus 10 is conducting communications via the base-transceiver station 200.

First, explanations will be given for a case where the mobile radio apparatus 10 newly starts communication with the base-transceiver station 200, by referring to FIG. 15 and FIG. 16.

FIG. 15 illustrates an exemplary sequence of a call connection process according to the first embodiment. FIG. 15 illustrates an example of a call process sequence of the mobile communication system 1 in a case where the mobile radio apparatus 10 newly starts communication via the base-transceiver station 200. As illustrated in FIG. 15, a call process sequence according to the first embodiment may be based on for example a call process sequence defined by 3GPP.

When the power of the mobile radio apparatus 10 has been turned on (process P1001), the mobile radio apparatus 10 conducts a cell search in order to find the base-transceiver station 200 that will become the connection target of the mobile radio apparatus 10 (process P1002). During the cell search, the measurement unit 12A receives broadcast signals respectively transmitted from the base-transceiver stations 200 around the position of the mobile radio apparatus 10, via the antennas 17, the reception unit 18, the demodulation unit 19, and the base band device 14. The measurement unit 12A obtains the cell identifier and the cell flag contained in each of the received broadcast signals. Also, the measurement unit 12A measures the received electric field strength of each of the received broadcast signals. A received electric field strength is an example of a radio quality of a broadcast signal. The measurement unit 12A stores the cell identifiers, the received electric field strengths, and the cell flags obtained from the respective broadcast signals in the cell list 13A in the storage unit 13 in an associated manner and in the order of received electric field strength.

Even after an attaching process for connecting the mobile radio apparatus 10 to the network has been executed (process P1003) between the mobile radio apparatus 10 and mobility management entity 70, the mobile radio apparatus 10 conducts a cell search at prescribed time intervals (process P1004). Also, the measurement unit 12A obtains the cell identifiers (cell IDs) and the cell flags from the respective broadcast signals received during the cell search, and measures the received electric field strengths of the respective broadcast signals. The measurement unit 12A stores the obtained cell identifiers, received electric field strengths, and cell flags in the cell list 13A. Thereby, data in the cell list 13A is updated for each repetition of a repeatedly conducted cell search.

When the control unit 12 is instructed via the external interface unit 11 by a user of the mobile radio apparatus 10 to start call connection for newly starting communication (process P1005), the control unit 12 executes a cell selection process according to the first embodiment. FIG. 16 illustrates an exemplary flow of a cell selection process according to the first embodiment.

When a cell selection process has started (step S1001), the control unit 12 refers to the cell list 13A stored in the storage unit 13 and determines whether or not the cell list 13A has a cell flag representing a call cell (step S1002). When the cell list 13A has more cell identifiers than a prescribed value, the control unit 12 may determine whether or not the cell list 13A has a cell flag representing a small cell from among cell flags corresponding to a prescribed number of cell identifiers in the order of received electric field strength.

When it is determined that there is not a cell flag representing a small cell (NO in step S1002), the control unit 12 terminates the cell selection process (step S1006). In such a case, the control unit 12 selects a macro cell in the cell list 13A as a call connection target cell. When a plurality of macro cells are included in the cell list 13A, the control unit 12 selects the cell with the highest received electric field strength.

When it is determined that there is a cell flag representing a small cell (YES in step S1002), the control unit 12 determines whether or not the received electric field strength of a macro call in the cell list 13A is equal to or lower than a reference value (step S1003). In other words, the measurement unit 12A determines whether or not the received electric field strength corresponding to a cell flag representing a macro cell is equal to or lower than a reference value.

When it is determined that the received electric field strength of a macro cell is lower than the reference value (NO in step S1003), the control unit 12 terminates the cell selection process (step S1006). In such a case, it is not preferable if call connection target cells are limited to macro cells that have received electric field strengths lower than the reference value. Accordingly, all the cells in the cell list 13A become candidates for the call connection target cell and the control unit 12 selects the cell with the highest received electric field strength as a call connection target cell from among all the cells included in the cell list 13A. A cell that may be selected may be a small cell or a macro cell.

When it is determined that the received electric field strength of a macro cell is equal to or higher than the reference value (Yes in step S1003), the control unit 12 determines whether the service of the call connection target communication is not a service that desires a high throughput (step S1004). Information regarding whether or not the service of the call connection target communication is not a service that desires a high throughput is obtained from the service confirmation unit 12B. When, for example, the definition of the QCIs is obeyed, the control unit 12 determines whether or not the QCI of the service of the call connection target communication is a value that is not two through four. The QCI of the service of the call connection target communication is obtained from the service confirmation unit 12B.

When it is determined that the service of the call connection target communication is a service requiring a high throughput (No in step S1004), the control unit 12 terminates the cell selection process (step S1006). In such a case, all the cells included in the cell list 13A become candidates for the call connection target cell, and the control unit 12 selects the cell with the highest received electric field strength as the call connection target cell from among all the cells included in the cell list 13A. A cell that may be selected is a small cell or a macro cell.

When it is determined that the service of the call connection target communication is not a service requiring a high throughput (YES in step S1004), the control unit 12 excludes small cells in the cell list 13A from the connection target cells (step S1005). The control unit terminates the cell selection process (step S1006). In this case, the control unit 12 selects a macro cell included in the cell list 13A as a connection target cell.

When the above cell selection process has been terminated, the control unit 12 requests a call connection from the base-transceiver station 200 that corresponds to the call connection target cell (process P1007), and receives a response to the request from that base-transceiver station (process P1008). Then, the mobile radio apparatus 10 starts communication via the call-connected base-transceiver station 200 (processes P1009 through P1014).

By the execution of the cell-selection control according to the first embodiment as described above, call connection to a small cell is suppressed for communication of a service that does not always desire a high throughput. As a result of this, it is made possible to suppress unnecessary handovers that may be caused by a situation where call connection is made to a small cell, which has a small covered communication district (covered scope), and to reduce the risk of call losses.

Also, by the execution of the cell-selection control according to the first embodiment, call connection to small cells for communication that does not always desire a high throughput is suppressed. As a result of this, it is possible to realize an operation that is suitable for the purposes of a heterogeneous network in which small cells, which cover small communication districts (covered scopes) and may realize a high throughput, are used together with a macro cell. As described above, by the execution of the cell-selection control according to the first embodiment, loads on a network can be optimized, making it possible to eliminate unnecessary equipment investments and to improve the radio quality.

Next, by referring to FIG. 16 and FIG. 17, explanations will be given for a case where the mobile radio apparatus 10 is conducting communications via the base-transceiver station 200.

Figure 17:
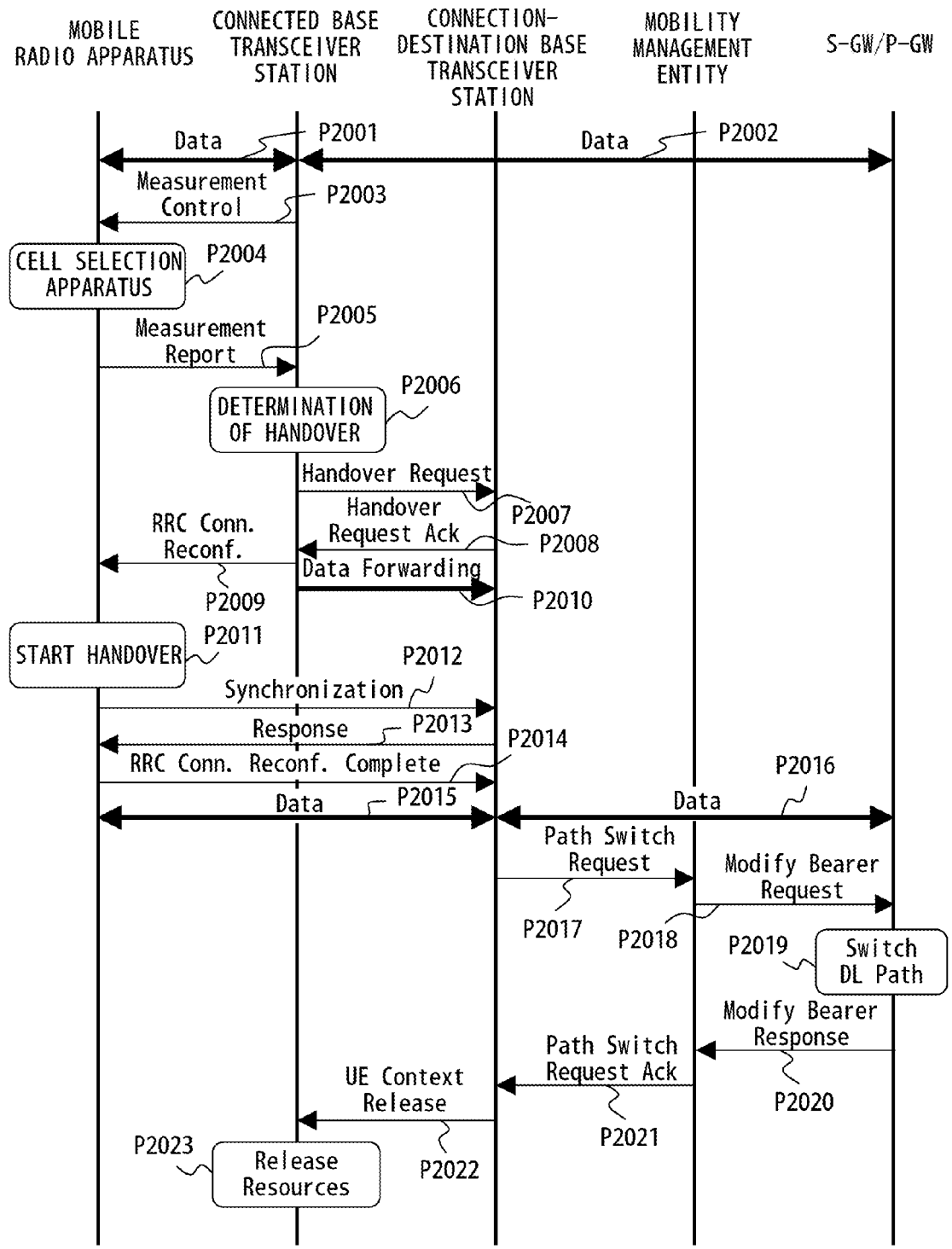
FIG. 17 illustrates an exemplary sequence of a handover process according to the first embodiment.

FIG. 17 illustrates an exemplary sequence of a handover process according to the first embodiment. FIG. 17 illustrates an example of a handover process sequence of the mobile communication system 1 in a case where the mobile radio apparatus 10 is conducting communications via the base-transceiver station 200. As illustrated in FIG. 17, a handover process sequence according to the first embodiment may be based on for example a handover process sequence defined by 3GPP. The process sequence illustrated in FIG. 17 is an example and a handover according to the embodiments may be an S1 handover, in which signal processes are executed by S1, which is a logical interface between a base-transceiver station and an EPC, or may be an X2 handover, in which signal processes are executed by X2, which is a logical interface between base-transceiver stations.

Data is transmitted and received between the mobile radio apparatus 10 and the base-transceiver station 200 (process P2001), and data is transmitted and received between the base-transceiver station 200, the serving gateway 80, and the packet data network gateway 100 (process P2002). In this manner, the mobile radio apparatus 10 is conducting communications via the base-transceiver station 200.

The measurement unit 12A receives a radio quality measurement instruction signal such as Measurement Control from the connected base-transceiver station 200 (process P2003). The connected base-transceiver station 200 is the base-transceiver station 200 that corresponds to a control cell before the execution of a handover, i.e., the source cell. Before the measurement unit 12A transmits a radio quality measurement report signal corresponding to the radio quality measurement instruction signal to the connected base-transceiver station 200, the control unit 12 executes the cell selection process described above by referring to FIG. 16 (P2004).

When for example the received electric field strength of a macro cell is lower than a prescribed reference value (No in step S1003), all the cells in the cell list 13A become candidates for the call connection target cell. When the service being communicated is a service that desires a high throughput (NO in step S1004), all the cells in the cell list 13A become candidates for the call connection target cell. In this situation, the control unit 12 selects the cell with the highest received electric field strength as the call connection target cell from among all the cells included in the cell list 13A. The measurement unit 12A measures the received electric field strengths of broadcast signals received from the base-transceiver stations 200 of all the cells in the cell list 13A, including the cell with the highest received electric field strength. Alternatively, the measurement unit 12A may measure the received electric field strengths of broadcast signals received from the base-transceiver stations 200 of a prescribed number of cells counted in descending order of received electric field strength in the cell list 13A. Received electric field strength is an example of radio quality. The measurement unit 12A transmits a radio quality report signal containing the measured received electric field strengths and the corresponding cell identifiers to the connected base-transceiver station 200 (process P2005). A transmitted radio quality report signal is for example a Measurement Report transmitted in response to Measurement Control received from the base-transceiver station 200.

Also, when for example the received electric field strength of a macro cell is equal to or higher than a prescribed reference value and the service being communicated is a service that does not desire a high throughput (Yes in step S1004), the control unit 12 selects a macro cell as a handover destination cell from among all the cells in the cell list 13A. In other words, the control unit 12 excludes small cells from among all the cells in the cell list 13A as candidates for a handover destination cell. The measurement unit 12A measures the received electric field strength of broadcast signals received from the base-transceiver stations 200 of macro cells in the cell list 13A. In other words, the measurement unit 12A does not measure received electric field strengths of small cells in the cell list. The measurement unit 12A transmits a radio quality report signal containing the measured received electric field strengths and the corresponding cell identifiers to the connected base-transceiver station 200 (process P2005). In other words, the measurement unit 12A does not report radio quality of small cells to the connected base-transceiver station 200.

The purpose of employing the above configuration in which the measurement unit 12A does not report the radio quality of small cells in the cell list to the connected base-transceiver station 200 is to prevent the connected base-transceiver station 200 from selecting the base-transceiver stations 200 corresponding to small cells as the handover-destination base-transceiver station 200. Therefore, it is also possible to employ a configuration in which for example the measurement unit 12A reports to the connected base-transceiver station 200 the worst value as the reception quality of small cells (the lowest value among received electric field strengths) together with the radio quality of a macro cell, while the measurement unit 12A does not report the radio quality of small cells to the connected base-transceiver station 200.

The connected base-transceiver station 200 receives a radio quality report signal transmitted from the measurement unit 12A. The connected base-transceiver station 200 determines according to the received radio quality report signal whether or not a handover was executed. Also, the connected base-transceiver station 200 determines according to the received radio quality report signal the base-transceiver station 200 serving as the handover destination when a handover is conducted (process P2006).

When for example the received electric field strength of a macro cell is lower than a prescribed reference value (NO in step S1003), the received radio quality report signal contains the received electric field strength of a small cell and the received electric field strength of a macro cell. Also, when the service being communicated is a service requiring a high throughput (NO in step S1004), the received radio quality report signal contains the received electric field strength of a small cell and the received electric field strength of a macro cell. Accordingly, in accordance with the determination of whether or not the received electric field strength of the cell corresponding to the connected base-transceiver station 200 is lower than a prescribed reference value, the connected base-transceiver station 200 first determines whether or not a handover was conducted. Next, when it has been determined that the received electric field strength of the cell corresponding to the connected base-transceiver station 200 is lower than a prescribed reference value and it has been determined that the execution of a handover will be executed, the connected base-transceiver station 200 determines the base-transceiver station 200 corresponding to the cell with the highest received electric field strength to be the base-transceiver station 200 serving as the connection destination after the execution of a handover. The base-transceiver station 200 serving as the connection destination after the execution of a handover is a control cell after the execution of a handover, i.e., the base-transceiver station 200 corresponding to the target cell. The cell with the highest received electric field strength may be a macro cell or a small cell.

When for example the received electric field strength of a macro cell is equal to or higher than a prescribed reference value and the service being communicated is a service that does not desire a high throughput (YES in step S1004), the received radio quality report signal only includes the received electric field strength of a macro cell. Alternatively, in some configurations, a received radio quality report signal contains the received electric field strength of the small cell for which the worst value is set, together with the received electric field strength of the macro cell. Accordingly, the connected base-transceiver station 200 first determines whether or not a handover was executed in accordance with the determination of whether or not the received electric field strength of the cell corresponding to the connected base-transceiver station 200 is lower than a prescribed reference value. In some configurations, when the cell corresponding to the connected base-transceiver station 200 is a small cell, the received electric field strength of the cell corresponding to the connected base-transceiver station 200 is not included in a received radio quality report signal. In such a configuration, the connected base-transceiver station 200 determines that the received electric field strength of the cell corresponding to the connected base-transceiver station 200 is lower than a prescribed reference value and determines that the execution of a handover will be executed. Next, when it has been determined that the received electric field strength of the cell corresponding to the connected base-transceiver station 200 is lower than the prescribed reference value and it has been determined that the execution of a handover will be executed, the connected base-transceiver station 200 determines the base-transceiver station 200 corresponding to the macro cell to be the base-transceiver station 200 serving as the connection destination after the execution of a handover.

The connected base-transceiver station 200 transmits a handover request to the connection-destination base-transceiver station 200 that has been determined to be the handover destination base-transceiver station 200 (process P2007). Thereafter, as illustrated in FIG. 17, a handover execution process is executed to conduct the handover from the connected base-transceiver station 200 to the connection-destination base-transceiver station 200 (processes P2008 through P2023).

As described above, by the execution of cell-selection control according to the first embodiment, handovers to a small cell are suppressed for communication of a service that does not always desire a high throughput. This makes it possible to suppress unnecessary handovers to a small cell, which has a small covered communication district (covered scope), and to reduce the risk of call losses.

Also, by the execution of the cell-selection control according to the first embodiment, handovers to a small cell are suppressed for communication that does not always desire a high throughput. As a result of this, it is possible to realize an operation that is suitable for the purposes of a heterogeneous network in which small cells, which cover small communication districts (covered scopes) and may realize a high throughput, are used together with a macro cell. As described above, by the execution of the cell-selection control according to the first embodiment, loads on a network can be optimized, making it possible to eliminate unnecessary equipment investments and to improve the radio quality.

Further, the cell-selection control according to the first embodiment excludes in advance cells that do not desire a handover from connection candidate cells before a mobile radio apparatus transmits a radio quality report signal. This makes it possible to avoid imposing loads of complicated processes on mobile radio apparatuses so as to reduce unnecessary data processing and to reduce power consumption in mobile radio apparatuses.

By referring to FIG. 18 and FIG. 19, explanations will be given for an example of an effect whereby the execution of the cell-selection control according to the first embodiment may suppress unnecessary handovers. FIG. 18 explains an exemplary handover operation for a case where the cell-selection control according to the first embodiment is not executed. FIG. 19 explains an exemplary handover operation for a case where the cell-selection control according to the first embodiment is executed.

FIG. 18 and FIG. 19 illustrate cases where mobile radio apparatuses A through D existing in macro cell MC have moved in the direction depicted by the arrows through small cells SC-A and SC-B. In the example illustrated in FIG. 18 and FIG. 19, it is assumed that the received electric field strengths of broadcast signals corresponding to macro cell MC and small cells SC-A and SC-B are equal to or higher than a prescribed reference value. The narrow arrows in FIG. 18 and FIG. 19 indicate that the corresponding mobile radio apparatuses are waiting to be connected. The thick arrows indicate that the corresponding mobile radio apparatuses are currently connected to services that do not desire a high throughput, such as telephone calls. The dotted-line arrows indicate that the corresponding mobile radio apparatuses are currently connected to services that desire a high throughput, such as video services. Stars (A) through (R) in FIG. 18 and FIG. 19 schematically represent the occurrences of handovers by the mobile radio apparatuses at the corresponding positions.

First, when the cell-selection control according to the first embodiment is not executed, the cell with the highest radio quality from among cells around the position of the mobile radio apparatus may be selected as the connection target cell regardless of the characteristics of connection-target communication services. As a result of this, as represented by stars (A) through (M) in FIG. 18, a handover occurs at the time points when mobile radio apparatuses A through C moved from macro cell MC to small cell SC-A, from small cell SC to macro cell MC, from macro cell MC to small cell SC-B, and from small cell SC-B to macro cell MC, except for time points when they are waiting for calls. Specifically, as illustrated in FIG. 18, a handover occurs four times respectively for mobile radio apparatuses A and B, twice for mobile radio apparatus C, and three times for mobile radio apparatus D.

Figure 16:
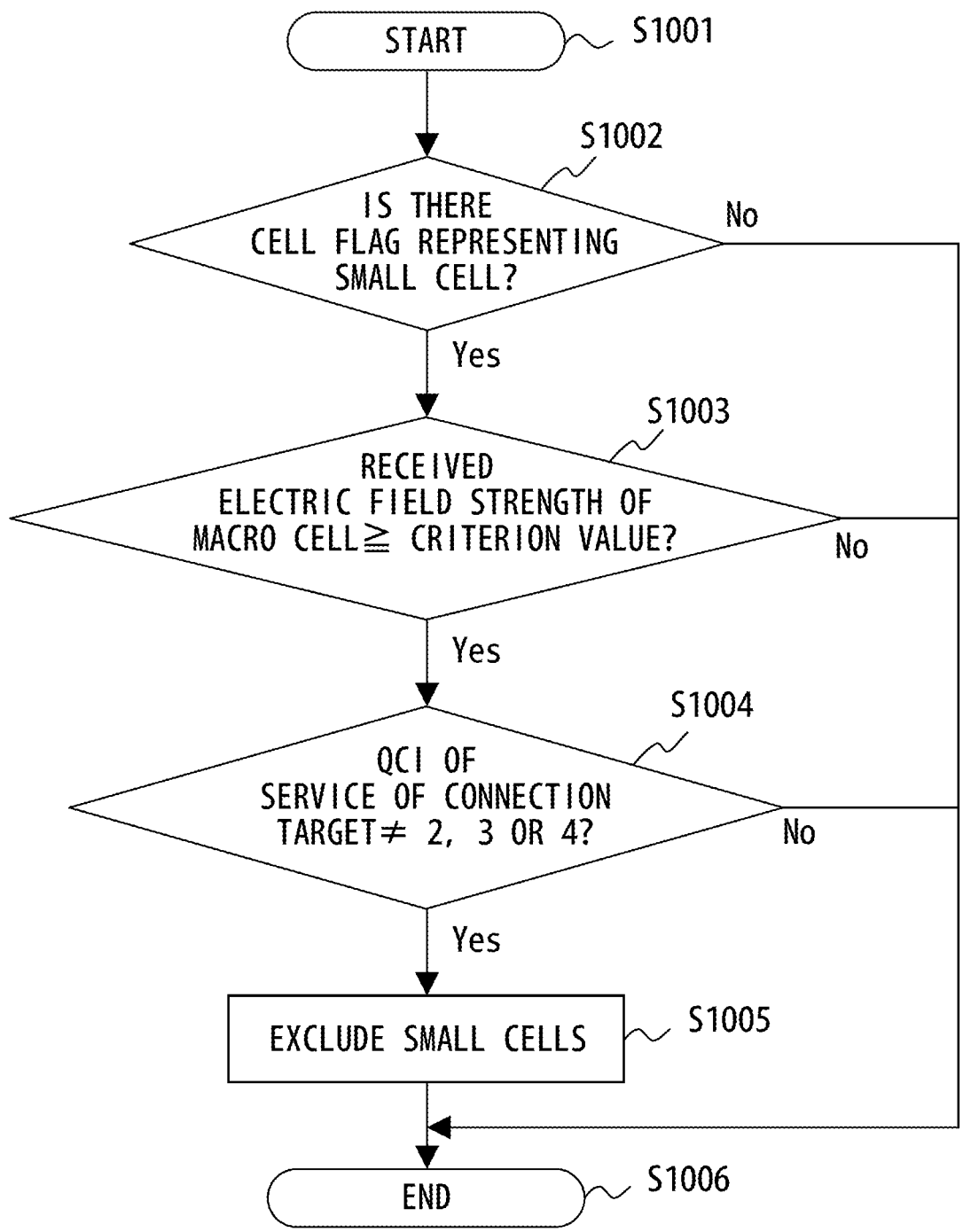
FIG. 16 illustrates an exemplary flow of a cell selection process according to the first embodiment.

When the cell-selection control according to the first embodiment is executed, mobile radio apparatus A, which is in a call in-progress state in all the sections as illustrated in FIG. 19, excludes small cells from connection target cells using the cell selection process according to the first embodiment as illustrated in FIG. 16. As a result of this, mobile radio apparatus A is connected to the macro cell in all the sections during the call and a handover is not conducted. Accordingly, when cell-selection control according to the first embodiment is not executed, handovers are conducted four times as depicted by (A) through (D) in FIG. 18, whereas the number of times handover is conducted can be reduce to zero for mobile radio apparatus A, as illustrated in FIG. 19.

As illustrated in FIG. 19, mobile radio apparatus B excludes small cells from connection target cells via the cell selection process according to the first embodiment in the sections in which calls are conducted as illustrated in FIG. 19. As a result of this, mobile radio apparatus B is in a call in-progress state and thus a handover is not conducted at a time point when it moves from macro cell MC to small cell SC-A. When the service being communicated is thereafter changed from a call to a video service in small cell SC-A, mobile radio apparatus B selects a connection target cell from among small cells and a macro cell using the cell selection process according to the first embodiment. As a result of this, when starting communication of the video service, mobile radio apparatus B existing in small cell SC-A selects small cell SC-A as the connection target cell instead of macro cell MC. Thereafter, each time mobile radio apparatus B moves from macro cell MC to small cell SC-B and macro cell MC, a handover is conducted in accordance with the cell selection process according to the first embodiment. Handovers are conducted four times when the cell-selection control according to the first embodiment is not executed as depicted by (E) through (H) in FIG. 18, whereas the number of times handovers are conducted can be reduced to three for mobile radio apparatus B as depicted by (N) through (P) in FIG. 19.

Mobile radio apparatus C does not exist in a small cell when communication of a video service is started, as illustrated in FIG. 19. Accordingly, mobile radio apparatus C selects macro cell MC as the connection target cell according to the cell selection process according to the first embodiment and starts the communication of a video service. When mobile radio apparatus C moves from macro cell MC to small cell SC-A, mobile radio apparatus C selects the connection target cell from among the small cells and the macro cell in accordance with the cell selection process according to the first embodiment. As a result of this, when mobile radio apparatus C moves from macro cell MC to small cell SC-A, a handover is conducted. When the service being communicated is thereafter changed from a video service to a call in small cell SC-A, mobile radio apparatus C excludes small cells from connection target cells using the cell selection process according to the first embodiment. As a result of this, when starting communication of the call, mobile radio apparatus B existing in small cell SC-A selects macro cell MC as the connection target cell instead of small cell SC-A. Also, even when mobile radio apparatus C has moved from small cell SC-A to macro cell MC, a handover does not occur. As described above, a handover is conducted twice as depicted by (I) through (J) in FIG. 18 when the cell-selection control according to the first embodiment is not executed, whereas the number of times handovers are conducted can be reduced to one for mobile radio apparatus C as depicted by (Q) illustrated in FIG. 19.

As illustrated in FIG. 19, mobile radio apparatus D starts a call after moving from macro cell MC to small cell SC-A. Accordingly, mobile radio apparatus D selects macro cell MC as the connection target cell instead of small cell SC-A in accordance with the cell selection process according to the first embodiment, so as to start the call. Even when mobile radio apparatus D thereafter moves to macro cell MC and to small cell SC-B, a handover is not conducted in accordance with the cell selection process according to the first embodiment. When the service being communicated is changed from a call to a video service in small cell SC-B, mobile radio apparatus D selects a connect target cell from among small cells and a macro cell in the cell selection process according to the first embodiment. As a result of this, mobile radio apparatus B existing in small cell SC-B selects small cell SC-B as the connection target cell when starting the video service. When mobile radio apparatus D thereafter moves from small cell SC-B to macro cell MC, a handover is executed by the cell selection process according to the first embodiment. As described above, a handover is conducted three times when the cell-selection control according to the first embodiment is not executed, as depicted by (K) through (M) in FIG. 18, whereas the number of times handovers are conducted can be reduced to one for mobile radio apparatus D, as depicted by (R) in FIG. 19.

From the example illustrated in FIG. 18 and FIG. 19 as well, it is possible to understand that the cell-selection control according to the first embodiment can reduce unnecessary handovers that may occur frequently due to increases in the number of cells without deteriorating the advantages of a heterogeneous network whereby the traffic is moderated and cell throughput is enhanced.

Note that the cell-selection control according to the first embodiment explained by referring to FIG. 1 through FIG. 19 is an example and various alterations, modifications and changes are allowed.

For example, the above explanations have used a specific example where cell-selection control is executed by using a cell flag representing a small cell or a macro cell. However, it is also possible for example to use, instead of a cell flag, a cell identification bit that can identify the type of a cell between a micro cell, a pico cell, a femto cell and a macro cell, as illustrated in FIG. 1. It is also possible to employ a configuration in which an arbitrary cell is selected as a connection target cell from among micro cells, pico cells, femto cells and macro cells by using a cell identification bit in accordance with the service that is the communication target of a mobile radio apparatus.

Also, the above explanations have used a specific example where the setting of a cell flag is maintained by a base-transceiver station before the start of the operation or is transmitted from a control terminal apparatus to a base-transceiver station after the start of the operation. However, a cell flag may be configured to be transmitted to a base-transceiver station from a different apparatus in the mobile communication system. Examples of a different apparatus that transmits a cell flag include a PCRF, a mobility management entity, a serving gateway, etc.

Second Embodiment

As described above, the mobile radio apparatus 10 obtains a cell flag contained in a broadcast signal transmitted from the base-transceiver station 200 and refers to the obtained cell flag so as to execute a cell selection process according to the first embodiment. A cell flag is stored in the base-transceiver station 200 before the starting of the operation of the base-transceiver station 200 in the cell-selection control according to the first embodiment. Alternatively, a cell flag corresponding to the base-transceiver station 200 may be transmitted to the base-transceiver station 200 from the control terminal apparatus 120 to that base-transceiver station 200 after the operation commencement thereof, and the transmitted cell flag may be stored in that base-transceiver station 200.

In the cell-selection control according to the second embodiment, a cell flag corresponding to the base-transceiver station 200 is transmitted to that base-transceiver station 200 in a prescribed time cycle after the operation commencement thereof, and the transmitted cell flag is stored in that base-transceiver station 200. Note that except for the points explained below, the configuration and the process operations of the mobile communication system according to the second embodiment may be similar to those of the mobile communication system 1 according to the first embodiment, which was described by referring to FIG. 1 through FIG. 19.

For example, during commuting hours, a large number of the mobile radio apparatuses 10 may move over a plurality of small cells that cover routes such as train railways, arterial highways, etc. During these hours, a situation may occur in which the inherent purpose of small cells, i.e., the attaining of a high throughput, is not achieved because a large number of the mobile radio apparatuses 10 may exist in one small cell. Also, during these hours, handovers may occur frequently because a large number of the mobile radio apparatuses 10 are moving over a plurality of small cells that cover the routes. As described above, during certain hours in certain areas, a situation may occur in which handovers occur so frequently that the disadvantage of the risk of call losses increasing emerges, whereas the advantage of being connected to small cells is not achieved. Accordingly, in order to limit connection to small cells during prescribed hours, the cell-selection control according to the second embodiment employs a configuration in which the control terminal apparatus 120 changes a cell flag representing a small cell into a cell flag representing a macro flag at a prescribed time of day, and the cell flag after the change is transmitted to the base-transceiver station 200 corresponding to the cell.

Specifically, the control terminal apparatus 120 holds in advance, in the storage 123, a cell flag setting table in which a cell flag is set for each prescribed period of time. FIG. 20 illustrates an example of the cell flag setting table according to the second embodiment. As illustrated in FIG. 20, in a cell flag setting table as illustrated in FIG. 20, the state of the cell flag, i.e., ON or OFF, for each date, day of the week, and time of day is recorded for each cell that is identified by a cell identifier (cell ID). A cell flag in the ON state represents a state in which the cell flag is set to a value representing a small cell, and a cell flag representing a small cell is for example "1". A cell flag in the OFF state represents a state in which a cell flag is set to a value representing a macro cell, and a cell flag representing a macro cell is for example "0". By changing a cell flag in accordance with the cell flag setting table, even when the corresponding cell is a small cell which has a small communication district, the cell is identified as a macro cell during hours in which the cell flag is set to "0".

Figure 21:
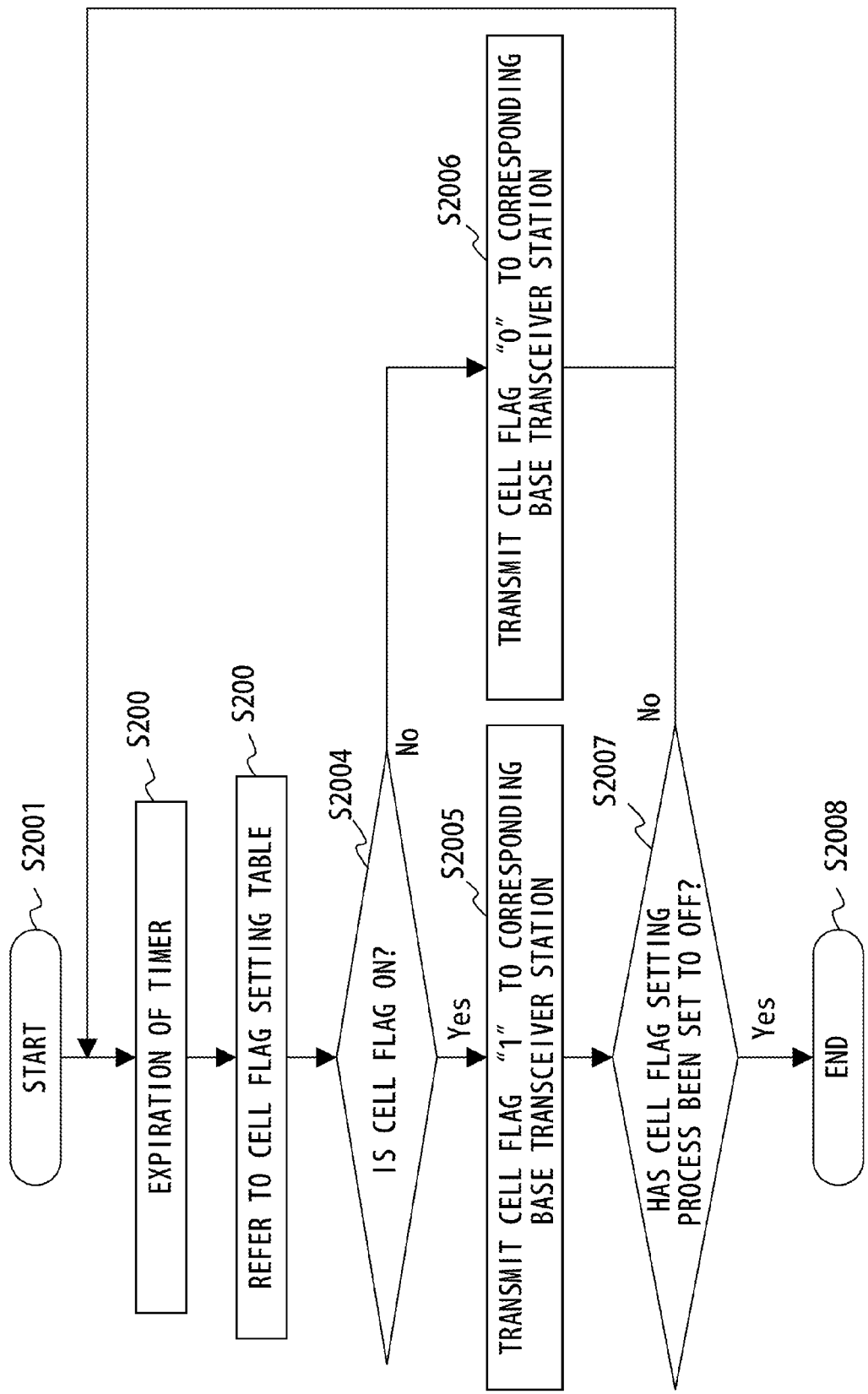
FIG. 21 illustrates an exemplary cell flag setting process flow of a control terminal apparatus according to the second embodiment.

The control terminal apparatus 120 transmits, once for each prescribed period of time, a cell flag recorded in the held cell flag setting table, to the corresponding base-transceiver station 200. FIG. 21 illustrates an exemplary cell flag setting process flow of a control terminal apparatus according to the second embodiment.

The cell flag setting process starts (step S2001), and when a preset timer has expired (step S2002), the CPU 121 reads, onto the memory 122, the cell flag setting table recorded in the storage 123. The CPU 121 refers to the read cell flag setting table (step S2003) and determines whether the cell flag of each cell corresponding to a cell identifier in the cell flag setting table is in the ON state or the OFF state (step S2004).

When it is determined that the cell flag corresponding to the cell is in the ON state (YES in step S2004), the CPU 201 reports the cell flag representing a small cell (for example "1") to the base-transceiver station 200 corresponding to the cell via the communication interface 127 (step S2005). When it is determined that the cell flag corresponding to the cell is in the OFF state (NO in step S2004), the CPU 201 reports the cell flag representing a macro cell (for example "0") to the base-transceiver station 200 corresponding to the cell via the communication interface 127 (step S2006).

The CPU 201 determines whether or not the cell flag setting process has been set to OFF (step S2007), and when it is determined that the cell setting process has been set to ON (NO in step S2007), the CPU 201 returns to the process in step S2002, and continues the cell flag setting process. When it is determined that the cell flag setting process has been set to OFF (YES in step S2007), the CPU 201 terminates the cell flag setting process (step S2008).

The base-transceiver station 200 receives a cell flag reported from the control terminal apparatus 120 once for each prescribed period of time. The cell flag stored in the base-transceiver station 200 is updated to the received cell flag, and a broadcast signal containing the updated cell flag is transmitted to the mobile radio apparatuses 10.

The mobile radio apparatus 10 receives the broadcast signal containing the updated cell flag from the base-transceiver station 200. The mobile radio apparatus 10 executes a cell selection process, as described above by referring to FIG. 16, in accordance with the received broadcast signal. When for example the service that is to be started newly or the service being communicated is a service that does not desire a high throughput, the mobile radio apparatus 10 excludes, from connection target cells, a cell for which the flag has been changed to a flag representing a small cell.

According to the above cell-selection control according to the second embodiment, it is made possible not only to perform cell-selection control in accordance with the service of communication provided to the mobile radio apparatuses 10 but also to perform cell-selection control in accordance with the area or time zone. This makes it possible to suppress unnecessary handovers to a small cell which covers a small communication district (covered scope), and to reduce the risk of call losses.

Also, by executing the cell-selection control according to the second embodiment, handovers are to a small cell are suppressed in an area or a time zone in which a high throughput is not guaranteed in addition to the suppression of handovers to a small cell for communication that does not always desire a high throughput. As a result of this, it is possible to realize an operation that is suitable for the purposes of a heterogeneous network in which small cells, which cover small communication districts (covered scopes) and may realize a high throughput, are used together with a macro cell. As described above, by the execution of the cell-selection control according to the second embodiment, loads on a network can be optimized, making it possible to eliminate unnecessary equipment investments and to improve the radio quality.

Further, the cell-selection control according to the second embodiment excludes in advance cells that do not desire a handover from connection candidate cells before a mobile radio apparatus transmits a radio quality report signal. This makes it possible to avoid imposing loads of complicated processes on mobile radio apparatuses so as to reduce unnecessary data processing and to reduce power consumption in mobile radio apparatuses.

Further, according to the cell-selection control according to the second embodiment, it is possible to automate cell-selection control in accordance with the types of services, areas, and time zones by using a control terminal apparatus such as a computer, without the need for operations conducted by administrative personnel of a mobile communication system.

Third Embodiment

In the cell-selection control according to the first embodiment, a call connection target cell is selected in accordance with the service that is the communication target of the mobile radio apparatus 10. Also, in the cell-selection control according to the second embodiment, a call connection target cell is selected in accordance with the area or time zone in addition to the service that is the communication target of the mobile radio apparatus 10.

In the cell-selection control according to the third embodiment, a call connection target cell is selected in accordance with the area or time zone regardless of the service that is the communication target of the mobile radio apparatuses 10. Note that except for the points explained below, the configuration and the process operations of the mobile communication system according to the third embodiment may be similar to those of the mobile communication system 1 according to the first or second embodiment, which was described by referring to FIG. 1 through FIG. 21.

The mobile radio apparatus 10 according to the third embodiment skips the determination process in step S1004 in the cell selection process illustrated in FIG. 16. In other words, when it is determined that the received electric field strength of a macro cell is equal to or higher than a reference value (YES in step S1003), the control unit 12 excludes small cells in the cell list 13A from call connection target cells (step S1005). Then, the control unit terminates the cell selection process (step S1006). As described above, by the skipping of the determination process in step S1004, the mobile radio apparatus 10 according to the third embodiment selects a call connection target cell in accordance with the area or time zone regardless of the service that is the communication target of the mobile radio apparatuses 10.

When the cell-selection control according to the third embodiment is executed, the mobile radio apparatus 10 does not have to include the service confirmation unit 12B because it is not necessary to confirm the service quality class of the service of connection target communication.

According to the above cell-selection control according to the third embodiment, it is possible to perform cell-selection control in accordance with the area or time zone. As a result of this, it is possible to suppress unnecessary handovers to a small cell which covers a small communication district (covered scope), and to reduce the risk of call losses.

Also, by the execution of the cell-selection control according to the third embodiment, handovers to a small cell are suppressed in an area or a time zone in which a high throughput is not guaranteed. As a result of this, it is possible to realize an operation that is suitable for the purposes of a heterogeneous network in which small cells, which cover small communication districts (covered scopes) and may realize a high throughput, are used together with a macro cell. As described above, by the execution of the cell selection process according to the third embodiment, loads on a network can be optimized, making it possible to eliminate unnecessary equipment investments and to improve the radio quality.

Further, the cell-selection control according to the third embodiment excludes in advance cells that do not desire a handover from connection candidate cells before a mobile radio apparatus transmits a radio quality report signal. This makes it possible to avoid imposing loads of complicated processes on mobile radio apparatuses so as to reduce unnecessary data processing and to reduce power consumption in mobile radio apparatuses.

Further, according to the cell-selection control according to the third embodiment, it is possible to automate cell-selection control in accordance with the area and time zone by using a control terminal apparatus such as a computer without the need for operations conducted by administrative personnel of a mobile communication system.

Fourth Embodiment

In the cell-selection control according to the first through third embodiments, the control unit 12, the measurement unit 12A and the service confirmation unit 12B in the mobile radio apparatus 10 are implemented in a hardware constituent such as the processor 10A-1 or the ASIC 10A-2.

In the cell-selection control according to the fourth embodiment, processes executed by the control unit 12, the measurement unit 12A, and the service confirmation unit 12B in the mobile radio apparatus 10 are under control of software instructions such as a cell-selection control program. The processor 10A-1 and the ASIC 10A-2 execute instructions of a cell-selection control program.

A cell-selection control program may be stored in a storage medium such as a CD-ROM, a DVD, a USB memory, a flash memory, etc. A cell-selection control program stored in a storage medium may be stored in the storage 10A-3 via the storage medium drive 10A-4, and the processor 10A-1 and the ASIC 10A-2 may read the stored cell-selection control program so as to execute it.

Also, a cell-selection control program may be stored in the storage 10A-3 via the radio communication apparatus 10A-7. The processor 10A-1 and the ASIC 10A-2 may read the stored cell-selection control program so as to execute it.

According to the cell-selection control according to fourth embodiment as well, it is possible to attain similar effects as those attained by the cell-selection control according to the first through third embodiments.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A mobile radio apparatus comprising:
    a measurement unit configured to receive a broadcast signal transmitted from at least one base-transceiver station corresponding to a cell around a position of the mobile radio apparatus, to obtain a cell identifier, contained in the received broadcast signal, for identifying the cell around the position of the mobile radio apparatus, and a cell flag, contained in the received broadcast signal, for identifying whether or not the cell around the position of the mobile radio apparatus is a small cell or a macro cell, and to store the obtained cell identifier and cell flag in a cell list;
    a service confirmation unit configured to confirm a service quality class for a service of call connection target communication; and
    a control unit configured to determine whether or not the service of the call connection target communication is a service that desires a high throughput by using the service quality class confirmed by the service confirmation unit when the cell list includes a cell flag representing a small cell, to select a macro cell from the cell list when it is determined that the service of the call connection target communication is a service that does not desire a high throughput, and to transmit a call connection request signal to a base-transceiver station corresponding to the selected macro cell.

2. The mobile radio apparatus according to claim 1, wherein
the control unit selects a macro cell from the cell list when it is determined that the service of the call connection target communication is a service that does not desire a high throughput in a case where the measurement unit has received a radio quality measurement instruction signal from a base-transceiver station that is call-connected to the mobile radio apparatus, and
the measurement unit measures a radio quality of a broadcast signal received from a base-transceiver station corresponding to the macro cell selected by the control unit and transmits a radio quality report signal containing the measured radio quality to the call-connected base-transceiver station.

3. The mobile radio apparatus according to claim 1, wherein
the cell flag contained in the broadcast signal is transmitted to a base-transceiver station from a control terminal apparatus connected to the base-transceiver station.

4. The mobile radio apparatus according to claim 3, wherein
the cell flag contained in the broadcast signal is transmitted from the control terminal apparatus to the base-transceiver station in accordance with a cell flag setting list in which setting of the cell flag is changed based on a date, day of week, and time of day.

5. A mobile communication system comprising:
a base-transceiver station configured to transmit a broadcast signal containing a cell identifier for identifying a cell corresponding to the base-transceiver station and a cell flag for identifying whether or not the cell is a small cell or a macro cell; and
a mobile radio apparatus configured to receive the broadcast signal transmitted from at least one base-transceiver station corresponding to a cell around a position of a mobile radio apparatus, to obtain a cell identifier and a cell flag contained in the received broadcast signal, to store the obtained cell identifier and cell flag in a cell list, to confirm a service quality class for a service of call connection target communication, to determine whether or not the service of the call connection target communication is a service that desires a high throughput by using the confirmed service quality class when the cell list includes a cell flag representing a small cell, to select a macro cell from the cell list when it is determined that the service of the call connection target communication is a service that does not desire a high throughput, and to transmit a call connection request signal to a base-transceiver station corresponding to the selected macro cell.

6. The mobile communication system according to claim 5, wherein
the mobile radio apparatus selects a macro cell from the cell list, measures radio quality of a broadcast signal received from a base-transceiver station corresponding to the selected macro cell, and transmits a radio quality report signal containing the measured radio quality to a base-transceiver station that is call-connected to the mobile radio apparatus when it is determined that the service of the call connection target communication is a service that does not desire a high throughput in a case where the measurement unit has received a radio quality measurement instruction signal from the base-transceiver station that is call-connected to the mobile radio apparatus.

7. The mobile communication system according to claim 5, wherein
the mobile communication system includes a control terminal apparatus that is connected to a base-transceiver station, and
the control terminal apparatus transmits the cell flag contained in the broadcast signal to the base-transceiver station.

8. The mobile communication system according to claim 7, wherein
the control terminal apparatus includes a cell flag setting list in which setting of the cell flag is changed based on a date, day of week, and time of day, and transmits the cell flag to the base-transceiver station in accordance with the cell flag setting list.

9. A non-transitory computer-readable recording medium having stored therein a cell-selection control program for causing a computer to execute a process to control a mobile radio apparatus, the process comprising:
controlling a measurement unit included in the mobile radio apparatus to receive a broadcast signal transmitted from at least one base-transceiver station corresponding to a cell around a position of the mobile radio apparatus;
controlling the measurement unit to obtain a cell identifier, contained in the received broadcast signal, for identifying the cell around the position of the mobile radio apparatus, and a cell flag, contained in the broadcast signal, for identifying whether or not the cell around the position of the mobile radio apparatus is a small cell or a macro cell;
controlling the measurement unit to store the obtained cell identifier and the cell flag in a cell list;
controlling a service confirmation unit included in the mobile radio apparatus to confirm a service quality class for a service of call connection target communication;
controlling a control unit included in the mobile radio apparatus to determine whether or not the service of the call connection target communication is a service that desires a high throughput by using the service quality class confirmed by the service confirmation unit when the cell list includes a cell flag representing a small cell;
controlling the control unit to select a macro cell from the cell list when it is determined that the service of the call connection target communication is a service that does not desire a high throughput; and
controlling the control unit to transmit a call connection request signal to a base-transceiver station corresponding to the selected macro cell.

10. The non-transitory computer-readable recording medium according to claim 9 wherein, the process further comprising:
controlling the control unit to select a macro cell from the cell list when it is determined that the service of the call connection target communication is a service that does not desire a high throughput in a case where the measurement unit has received a radio quality measurement instruction signal from a base-transceiver station that is call-connected to the mobile radio apparatus;
controlling the measurement unit to measure radio quality of a broadcast signal received from a base-transceiver station corresponding to the selected macro cell; and controlling the measurement unit to transmit a radio quality report signal containing the measured radio quality to the call-connected base-transceiver station.

11. The non-transitory computer-readable recording medium according to claim 9, wherein the cell flag contained in the broadcast signal is transmitted to a base-transceiver station from a control terminal apparatus that is connected to the base-transceiver station.

12. The non-transitory computer-readable recording medium according to claim 11, wherein the cell flag contained in the broadcast signal is transmitted from the control terminal apparatus to the base-transceiver station in accordance with a cell flag setting list in which setting of the cell flag is changed based on a date, day of week, and time of day.

* * * * *